United States Patent
Guo et al.

(10) Patent No.: US 12,164,037 B2
(45) Date of Patent: Dec. 10, 2024

(54) SAFE TRAVERSABLE AREA ESTIMATION IN UNSTRUCTURED FREE-SPACE USING DEEP CONVOLUTIONAL NEURAL NETWORK

(71) Applicant: Serve Operating Co., Redwood City, CA (US)

(72) Inventors: Zhenyu Guo, Vancouver (CA); Kaiwen Yuan, Vancouver (CA); Ali Haghighat Kashani, Vancouver (CA); Bastian Jan Michael Lehmann, San Francisco, CA (US); Sean Tracey Plaice, San Francisco, CA (US)

(73) Assignee: Serve Operating Co., Redwood City, CA (US)

( * ) Notice: Subject to any disclaimer, the term of this patent is extended or adjusted under 35 U.S.C. 154(b) by 931 days.

(21) Appl. No.: 17/250,449

(22) PCT Filed: Jul. 25, 2019

(86) PCT No.: PCT/US2019/043408
§ 371 (c)(1),
(2) Date: Jan. 22, 2021

(87) PCT Pub. No.: WO2020/023731
PCT Pub. Date: Jan. 30, 2020

(65) Prior Publication Data
US 2021/0165413 A1    Jun. 3, 2021

Related U.S. Application Data

(60) Provisional application No. 62/703,852, filed on Jul. 26, 2018.

(51) Int. Cl.
*G01S 17/931*    (2020.01)
*G01S 19/42*    (2010.01)
(Continued)

(52) U.S. Cl.
CPC ............ *G01S 17/931* (2020.01); *G01S 19/42* (2013.01); *G05D 1/0214* (2013.01); *G05D 1/024* (2013.01);
(Continued)

(58) Field of Classification Search
CPC ..... G01S 17/931; G01S 19/42; G05D 1/0214; G05D 1/024; G05D 2201/0213;
(Continued)

(56) References Cited

U.S. PATENT DOCUMENTS

2015/0202770 A1    7/2015  Patron et al.
2019/0332118 A1*   10/2019 Wang ..................... G06N 20/00

FOREIGN PATENT DOCUMENTS

CN          108229366 A  *  6/2018  ............. G01S 17/86
WO     WO-2020035661 A1  *  2/2020  ........... G05D 1/0251

OTHER PUBLICATIONS

PCT International Search Report and Written Opinion, mailed Nov. 6, 2019 in PCT/US19/43408.
(Continued)

*Primary Examiner* — Anne Marie Antonucci
*Assistant Examiner* — Jewel Ashley Kuntz
(74) *Attorney, Agent, or Firm* — Weaver Austin Villeneuve & Sampson LLP

(57) ABSTRACT

Techniques described in this application are directed to determining safe path navigation of an unmanned vehicle, including a sidewalk robot, using LIDAR sensors and/or other data.

18 Claims, 12 Drawing Sheets

(51) Int. Cl.
    *G05D 1/00*     (2024.01)
    *G06N 3/08*     (2023.01)
    *G06V 10/764*     (2022.01)
    *G06V 10/77*     (2022.01)
    *G06V 10/82*     (2022.01)
    *G06V 20/10*     (2022.01)
    *G06V 20/56*     (2022.01)

(52) U.S. Cl.
    CPC ............ *G06N 3/08* (2013.01); *G06V 10/764* (2022.01); *G06V 10/7715* (2022.01); *G06V 10/82* (2022.01); *G06V 20/10* (2022.01); *G06V 20/56* (2022.01); *G06V 20/588* (2022.01)

(58) Field of Classification Search
    CPC ...... G05D 1/0221; G06N 3/08; G06V 10/764; G06V 10/7715; G06V 10/82; G06V 20/10; G06V 20/56; G06V 20/588; G06F 18/213; B25J 9/162; G06Q 10/08
    See application file for complete search history.

(56) References Cited

OTHER PUBLICATIONS

Caltagirone, Luca, et al., "Fast LIDAR-based Road Detection Using Fully Convolutional Neural Networks" (version 2), Mar. 29, 2017, pp. 1-6 https://arxiv.org/pdf/1703.03613v2.pdf [retrieved on Oct. 17, 2019].

Morales, Yoichi, et al., "Autonomous Robot Navigation in Outdoor Cluttered Pedestrian Walkways", *Journal of Field Robotics*, vol. 26, No. 8, Aug. 1, 2009, pp. 609-635.

Trulls, E., et al., "Autonomous Navigation for Mobile Service Robots in Urban Pedestrian Environments", *Journal of Field Robotics*, vol. 28, No. 3, Mar. 16, 2011, pp. 329-354.

* cited by examiner

SAFE TRAVERSABLE AREA ESTIMATION IN UNSTRUCTURED FREE-SPACE USING DEEP CONVOLUTIONAL NEURAL NETWORK

CROSS-REFERENCES TO RELATED APPLICATIONS

The present application is a U.S. national phase under 35 U.S.C. § 371 of International Application No. PCT/US19/43408, filed Jul. 25, 2019, which claims priority to and the benefit of U.S. Provisional Patent Application No. 62/703,852, filed Jul. 26, 2018, both of which are incorporated by reference in their entireties for all purposes.

BACKGROUND OF THE INVENTION

Autonomous operation of vehicles needs improvement.

BRIEF SUMMARY OF THE INVENTION

One aspect of the present disclosure relates to systems and methods for determining a safe traversable area. For example, the disclosure may include a sidewalk robot comprising a LIDAR sensor; a vehicle system comprising mechanics and power source to propel the sidewalk robot along a path of an environment; a processor; and a non-transitory computer readable media including instructions that, when executed by the processor, cause the processor to: projecting a laser light from the LIDAR sensor, wherein the projection is directed toward the environment occupied by the sidewalk robot; receiving one or more reflections of the laser light as LIDAR data for a safe traversable area of the environment that includes a sidewalk, wherein the safe traversable area is absent lane markers and corresponds with a metro geography, and wherein the LIDAR data corresponds with a three-dimensional layout of the environment; projecting the three-dimensional layout of the environment to one or more two-dimensional frames, wherein the one or more two-dimensional frames correspond with different perspectives associated with the sidewalk robot in the environment; providing the one or more two-dimensional frames to a trained algorithm, wherein output of the trained algorithm generates a mask identifying the safe traversable area of the environment and non-traversable area of the environment; and enabling operation of the sidewalk robot using the mask, wherein the operation of the sidewalk robot avoids the non-traversable area of the environment.

In some examples, the instructions of the sidewalk robot further comprises: training an algorithm to generate the trained algorithm, wherein the training comprising: determining a plurality of inputs associated with the safe traversable area; and applying the plurality of inputs to the algorithm to generate the trained algorithm. In some examples, the trained algorithm is provided to the sidewalk robot when a difference between a first safe traversable area (STA) and a second STA are within a threshold accuracy for the environment. In some examples, the mask identifies dynamic and static objects. In some examples, the mask identifying the safe traversable area of the environment is a first mask and the instructions further comprise: receiving RGB data, wherein the RGB data is received as a two-dimensional frame; providing the RGB data as input to a second trained algorithm, wherein second output of the second trained algorithm produces a second mask; and combining the first mask and the second mask to generate a combined mask identifying the safe traversable area of the environment and the non-traversable area of the environment. In some examples, the operation of the sidewalk robot using the mask avoids using a high-definition (HD) map or a global positioning system (GPS).

Another aspect of the disclosure comprises a non-transitory computer-readable storage medium storing a plurality of instructions executable by one or more processors, the plurality of instructions when executed by the one or more processors cause the one or more processors to: project a laser light from a LIDAR sensor of a sidewalk robot, wherein the projection is directed toward an environment occupied by the sidewalk robot; receive one or more reflections of the laser light as LIDAR data for a safe traversable area of the environment that includes a sidewalk, wherein the safe traversable area is absent lane markers and corresponds with a metro geography, and wherein the LIDAR data corresponds with a three-dimensional layout of the environment; project the three-dimensional layout of the environment to one or more two-dimensional frames, wherein the one or more two-dimensional frames correspond with different perspectives associated with the sidewalk robot in the environment; provide the one or more two-dimensional frames to a trained algorithm, wherein output of the trained algorithm generates a mask identifying the safe traversable area of the environment and non-traversable area of the environment; and enable operation of the sidewalk robot using the mask, wherein the operation of the sidewalk robot avoids the non-traversable area of the environment.

In some examples, the instructions of the sidewalk robot further comprises: train an algorithm to generate the trained algorithm, wherein the training comprising: determining a plurality of inputs associated with the safe traversable area; and applying the plurality of inputs to the algorithm to generate the trained algorithm. In some examples, the trained algorithm is provided to the sidewalk robot when a difference between a first safe traversable area (STA) and a second STA are within a threshold accuracy for the environment. In some examples, the mask identifies dynamic and static objects. In some examples, the mask identifying the safe traversable area of the environment is a first mask and the instructions further comprise: receiving RGB data, wherein the RGB data is received as a two-dimensional frame; providing the RGB data as input to a second trained algorithm, wherein second output of the second trained algorithm produces a second mask; and combining the first mask and the second mask to generate a combined mask identifying the safe traversable area of the environment and the non-traversable area of the environment. In some examples, the operation of the sidewalk robot using the mask avoids using a high-definition (HD) map or a global positioning system (GPS).

Another aspect of the disclosure comprises a computer-implemented method comprising: projecting a laser light from a LIDAR sensor of a sidewalk robot, wherein the projection is directed toward an environment occupied by the sidewalk robot; receiving one or more reflections of the laser light as LIDAR data for a safe traversable area of the environment that includes a sidewalk, wherein the safe traversable area is absent lane markers and corresponds with a metro geography, and wherein the LIDAR data corresponds with a three-dimensional layout of the environment; projecting the three-dimensional layout of the environment to one or more two-dimensional frames, wherein the one or more two-dimensional frames correspond with different perspectives associated with the sidewalk robot in the environment; providing the one or more two-dimensional frames to a trained algorithm, wherein output of the trained algorithm generates a mask identifying the safe traversable area of the environment and non-traversable area of the environment; and enabling operation of the sidewalk robot using the mask, wherein the operation of the sidewalk robot avoids the non-traversable area of the environment.

In some examples, the computer-implemented method further comprises: training an algorithm to generate the trained algorithm, wherein the training comprising: determining a plurality of inputs associated with the safe traversable area; and applying the plurality of inputs to the algorithm to generate the trained algorithm. In some examples, the trained algorithm is provided to the sidewalk robot when a difference between a first safe traversable area (STA) and a second STA are within a threshold accuracy for the environment. In some examples, the mask identifies dynamic and static objects. In some examples, the mask identifying the safe traversable area of the environment is a first mask and the instructions further comprise: receiving RGB data, wherein the RGB data is received as a two-dimensional frame; providing the RGB data as input to a second trained algorithm, wherein second output of the second trained algorithm produces a second mask; and combining the first mask and the second mask to generate a combined mask identifying the safe traversable area of the environment and the non-traversable area of the environment. In some examples, the operation of the sidewalk robot using the mask avoids using a high-definition (HD) map or a global positioning system (GPS).

DETAILED DESCRIPTION OF THE INVENTION

Figure 1:
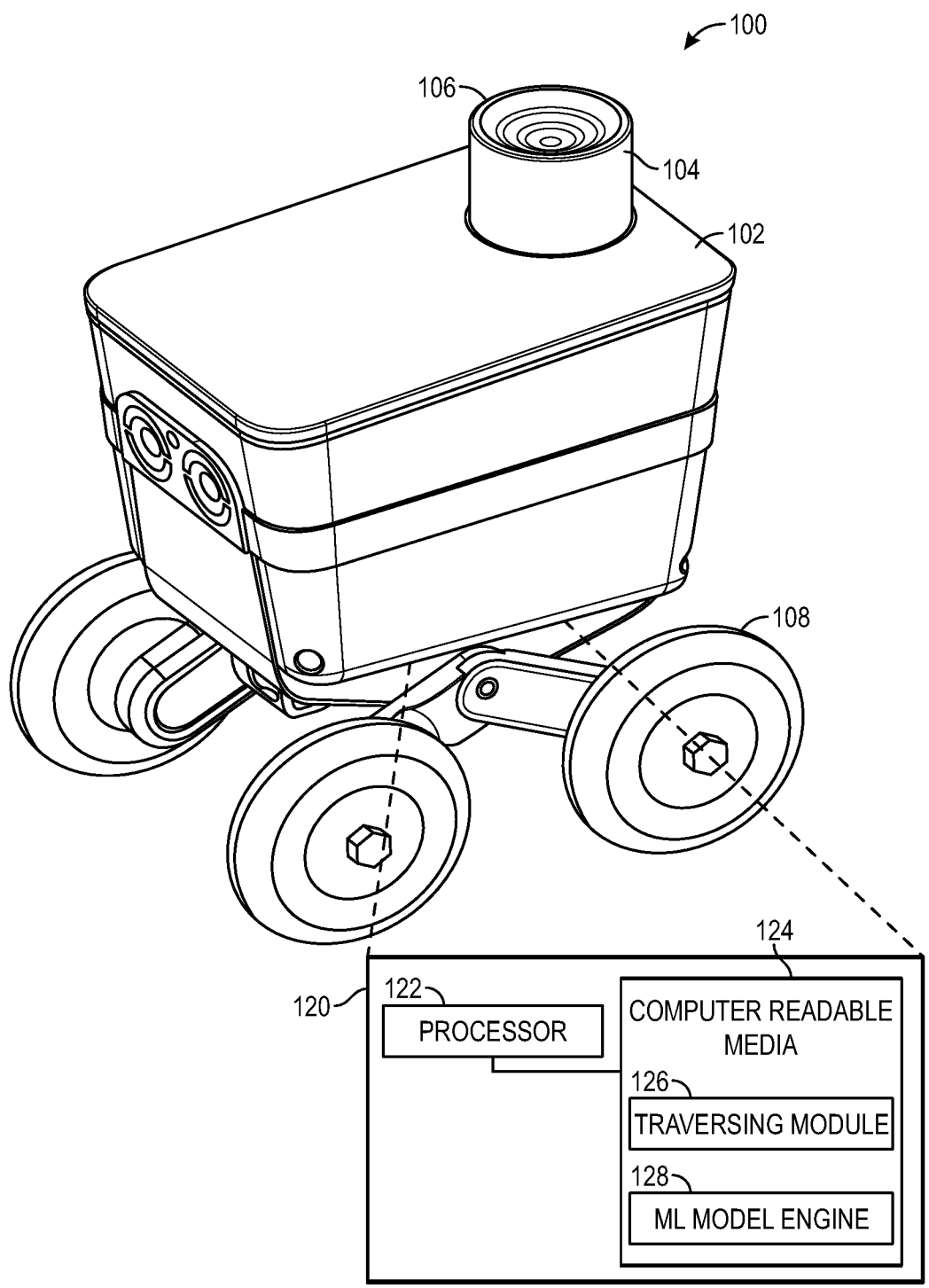
FIG. 1 is a block diagram illustrating an example of a sidewalk robot in a distributed network according to an embodiment of the disclosure.

The description provided herein includes illustrative embodiments only and is not intended to limit the scope, applicability, or configuration of the disclosure. Rather, the description will provide those skilled in the art with an enabling description for implementing a preferred exemplary embodiment. It is understood that various changes can be made in the function and arrangement of elements without departing from the scope as set forth in the claims.

Embodiments of the application describe various improvements to systems, methods, and devices throughout a communication network to determine safe path navigation of an unmanned vehicle, including a sidewalk robot, using LIDAR (e.g., LIght Detection And Ranging) sensors and/or other data. For example, the sidewalk robot can navigate a free-form space such as sidewalks by predicting a safe traversable area (e.g., "STA") which can be used for path planning autonomously. The sidewalk robot may use sensory data from, for example, LIDAR and other sensors, to make a prediction of a STA while the sidewalk robot is navigating. In some examples, the sidewalk robot may identify the path without using an existing prebuilt map. An algorithm (e.g., machine learning model, deep learning algorithm, etc.) may predict the STA within or outside of a sidewalk. This may include automatic timing of actions that can allow the sidewalk robot to perform an action when it is safe according to output of the algorithm, such as when the sidewalk robot may cross an intersection or when the sidewalk robot may travel on a detoured path (e.g., from a temporary construction site). In some examples, this process may be used as a foundation for path planning for any vehicle that navigates on sidewalks semi-autonomously or autonomously.

In some examples, for a sidewalk robot to navigate autonomously in a space, the sidewalk robot may plan a path that not only avoids colliding with static or dynamic obstacles, but also keeps the sidewalk robot within a safe and traversable area. This may include when the sidewalk robot travels on a sidewalk next to a road, the sidewalk robot may plan paths within the sidewalk instead of leading itself off a curb, into tree pits where it can get stuck, or onto the street where it can encounter danger. The paths may account for traveling in unlabeled or labeled areas, including a crossing area defined by traffic markers or following instructions indicated by the detouring traffic signs and/or traveling on a road where the sidewalk robot may interact with moving vehicles.

Identifying a STA in an unstructured environment may have a number of challenges. For example, a sidewalk can be of various widths, layouts, and pavement materials. When the STA does not use a pre-built map that includes that information, the identification of the width, layouts, and pavement materials, for example, may occur in real-time while the sidewalk robot is moving. In addition, dynamic objects may also navigate the paths, including pedestrians, skateboarders, cyclists, strollers, animals, and vehicles (e.g., driving out of a driveway and over a sidewalk). The presence of such dynamic objects may continuously change the perceived layouts of the free-space that are used to identify the STA, which can make the prediction of the STA challenging.

In order to avoid collision with both static and dynamic obstacles on the sidewalk during navigation, the sidewalk robot may estimate the safe traversable area (STA) in three-dimensional space, estimate the exact positions of static obstacles, estimate the exact current positions of dynamic obstacles in three-dimensional space, and track the past positions of dynamic obstacles in order to predict their future positions in the three-dimensional space. In some examples, the sidewalk robot may build an occupancy map (e.g., a quantized gridded map with values indicated if this position in three-dimensional space is occupied or empty, or unknown, etc.) with semantic information (e.g., STA, static object class names, dynamic objects class names and tracks of each instance). The occupancy map may comprise a local map centered at the robot's position. This may be different than a high-definition (HD) map that gives absolute positions of the sidewalk robot according to a global positioning system (GPS). A motion planner may use the occupancy map with the semantic and historical information and sensory data to generate a future trajectory for the sidewalk robot to follow. The motion planner may re-plan frequently to deal with highly dynamic scenes.

In some examples, the sidewalk robot may comprise one or more sensors, including LIDAR sensors, to identify a sidewalk in various objects associated with the sidewalk. The LIDAR data may measure distance to an object by illuminating the object with laser light and measuring the reflected light with the sensor. The LIDAR sensor may use ultraviolet, visible, or near infrared light to target a wide range of materials. The differences in laser return times and wavelengths can be used to make a three-dimensional representation of the sidewalk, static and dynamic objects, and the environment. The LIDAR data may be combined with other data, including image data from RGB cameras.

The algorithm may be trained using the LIDAR data, where the output of the algorithm can identify a safe traversable area (STA) within a sidewalk and areas adjacent when necessary. Upon receiving LIDAR data, a trajectory of the human pilot training robot may be projected onto a representation of the range of data from sensors. The projection may include the LIDAR data in order to train the algorithm to identify the safe traversable area. The sidewalk robot may receive real-time LIDAR data that can be applied to the trained algorithm. In some examples, a pre-built map of the area is not necessary, but may be used to supplement the LIDAR and/or image data.

These and other embodiments may be described throughout the disclosure as technical improvements over conventional systems, including distinguishing features from other unmanned vehicle operation. For example, in aerial unmanned vehicle (e.g., drone, etc.) operation, vehicles may identify dynamic or static obstacles in order to identify a traversable area in the sky. However, the aerial operation may not need to identify obstacles that may roll over (e.g., grass, potholes, cracks in cement, etc.) or otherwise interact with the wheels of the vehicle. The unmanned aerial vehicle would not operate wheels during most the unmanned vehicle operation. Additionally, when approaching obstacles that are dynamic or static, the aerial unmanned vehicle may not need to interact with individuals walking along the sidewalk, sandwich board advertisements for restaurants along the path, and/or may be able to identify more options for altering a path along a STA, including increasing or decreasing elevation that would be unavailable to the sidewalk robot.

These features may also be distinguishable from unmanned vehicle operation on highways and roads. For example, self-driving cars may often rely on an HD map to define a global route that can overlay to a middle of the lane the car is on, then follow the route by maintaining a relative position in the middle of the lane. In some examples, self-driving cars may not need to estimate a traversable area, but rather follow an approximate middle between two sets of lane markers and/or a map definition. Additionally, the road traveled by the self-driving cars may correspond with a structured environment that includes minimal occurrences of static obstacles. In comparison, a sidewalk may correspond with an unstructured environment, where the sidewalk robot may proactively avoid static obstacles on the sidewalk blocking the path. Additionally, sidewalk robots may interact with pedestrians, more frequently than self-driving cars. For example, interactions along a sidewalk may include nonverbal and subtle communications that may be difficult to understand the pedestrian's intention, or to convey the intention of the sidewalk robot to other pedestrians.

Several distinctions may also be found between roads and sidewalks. For example, roads correspond with explicit traffic rules and self-driving cars may operate with an expectation that other cars or other road users (e.g., pedestrians, bikers, motorcyclists, etc.) may not violate the rules in normal cases. There may be no similarly explicit rules for sidewalk users (e.g., sidewalk robots, pedestrians, scooters, animals, etc.). The path along the sidewalk may be reliant on understanding other sidewalk users' behaviors and determining a strategy to move forward with static and dynamic objects along the same path.

These and other improvements are discussed throughout the disclosure.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will be described in more detail below in the following specification, claims, and accompanying drawings.

FIG. 1 is a block diagram illustrating an example of a sidewalk robot in a distributed network according to an embodiment of the disclosure. In illustration 100, sidewalk robot 102 is provided. Sidewalk robot 102 may comprise one or more sensors, including LIDAR sensor 104 and image sensor 106 (e.g., RGB, etc.). Sidewalk robot 102 may travel along the path using vehicle system 108. Sidewalk robot 102 may also comprise computing device 120, including processor 122 and computer readable media 124 for storing instructions to perform one or more actions by sidewalk robot 102. In some examples, sidewalk robot 102 may include an antenna to communicate with a global positioning system (GPS) or other computer system, and an inertial measurement unit (IMU) to measure and report force, angular rate, and orientation of sidewalk robot 102 using a combination of accelerometers, gyroscopes, and sometimes magnetometers.

LIDAR sensor 104 may comprise a laser range finder or other light source reflected by a rotating mirror. The laser may be projected around the environment of sidewalk robot 102 to scan and digitize the environment. The projection of the laser may occur in three-dimensions around LIDAR sensor 104 to gather distance measurements at specified angle intervals. An illustrative example of the reflective process of LIDAR sensor 104 is provided with FIG. 9.

Image sensor 106 may comprise an optical instrument to capture still images (e.g., photographs, etc.) or moving images (e.g., video images, etc.) around the environment of sidewalk robot 102 to scan and digitize the environment. The images may be recorded as two-dimensional depictions of the space. The images may be stored in a non-transitory computer readable medium of sidewalk robot 102 or a computer system illustrated in FIG. 2. Image sensor 106 may comprise a lens which focuses light from the environment and a camera body which holds the lens with image capture mechanism.

Other sensors may be associated with sidewalk robot 102 as well, including and not limited to computer vision cameras, accelerometers, IMUs, a GPS transmitter/receiver, ultrasonic range sensors, stereo-cameras, depth cameras, and/or bump sensors. The imaging and depth sensors (e.g., LIDAR, ultrasonic, cameras, stereo cameras, depth cameras) may be used to detect obstacles that may be placed on the digitized map of the surroundings. Using algorithms, it is possible but not mandatory to identify the obstacles as stationary (e.g., walls, poles, parking meters, etc.) or dynamic such as other road users (e.g., pedestrians, bicyclist, animals, cars, etc.). It is also possible but not mandatory to calculate the trajectory of dynamic obstacles to estimate the possibility of a collision. In some examples, the sensors may be used to create a map of the surrounding environment using algorithms such as SLAM (e.g., simultaneous localization and mapping) as well as locating the SPMD (e.g., single program, multiple data) in the global reference frame. These maps may be generated and/or utilized in addition to the imaging and depth sensor data.

Vehicle system 108 may be associated with mechanics and power source to propel sidewalk robot 102 along a path, including one or more of a chassis with two or four wheels, gearbox, drivetrain, motor, controller, transmission, built-in battery, and the like. These systems may be used to propel sidewalk robot 102 in a determined direction of the environment according to instructions received from computing device 120.

Computing device 120 may comprise various components, including processor 122 and computer readable media 124 for storing instructions to perform one or more actions by sidewalk robot 102.

Processor 122 may control the operation of sidewalk robot 102 and may comprise one or more Application Specific Integrated Circuits (ASICs) or Field Programmable Gate Arrays (FPGAs). Processor 122 may include single core and/or multicore processors. The processing resources of sidewalk robot 102 may be organized into one or more processing units. A processing unit may include one or more processors, one or more cores from the same or different processors, a combination of cores and processors, or other combinations of cores and processors. In some embodiments, processor 122 may include one or more special purpose co-processors such as graphics processors, Digital Signal Processors (DSPs), or the like. In some embodiments, processor 122 may be implemented using customized circuits.

In some embodiments, processor 122 may execute instructions stored on computer readable media 124. In various embodiments, processor 122 may execute a variety of programs or code instructions and may maintain multiple concurrently executing programs or processes. At any given time, some or all of the program code to be executed may be resident on computer readable media 124 including potentially on one or more storage devices. Through suitable programming, processor 122 may provide various functionalities described above.

Sidewalk robot 102 may comprise an antenna and/or communication interface to provide an interface to other computer systems and networks and may serve as an interface for receiving data from and transmitting data to other systems or client devices. For example, the communication interface may enable sidewalk robot 102 to establish a communication channel to one or more client devices or computer systems via the external communication network for receiving and sending information to and from client devices and computer systems. Communication interface may support radio frequency (RF) transceiver components for accessing wireless voice and/or data networks, cellular telephone technology, advanced data network technology, such as 3G, 4G, EDGE (enhanced data rates for global evolution), WiFi (IEEE 802.XX family standards, or other mobile communication technologies, or any combination thereof), global positioning system (GPS) receiver components, and/or other components.

Computer readable media 124 may store program instructions that are loadable and executable on processor 122, as well as data generated during execution of programs. Depending on the configuration and type of sidewalk robot 102, memory may be volatile (e.g., random access memory (RAM), etc.) and/or non-volatile (e.g., read-only memory (ROM), flash memory, etc.). Computer readable media 124 may also include additional removable storage and/or non-removable storage including, but not limited to, magnetic storage, optical disks, and/or tape storage. The disk drives and associated computer-readable media may provide non-volatile storage of computer-readable instructions, data structures, program modules, and other data for sidewalk robot 102. In some implementations, computer readable media 124 may include multiple different types of memory, such as static random access memory (SRAM), dynamic random access memory (DRAM), solid-state drive (SSD), or ROM.

Computer readable media 124 may further comprise an operating system (O/S), traversing module 126 and/or ML model engine 128. The modules and engines described herein may be software modules, hardware modules, or a combination thereof. If the modules are software modules, the modules will be embodied in a non-transitory computer readable medium and processed by processor 122 with computer systems described herein.

Traversing module 126 may be configured to determine a safe traversable area (STA) for travel by sidewalk robot 102. For example, LIDAR sensor 104 may be configured to capture LIDAR data in a three-dimensional space around sidewalk robot 102. The raw LIDAR data may be received by directing one or more lasers in multiple directions around sidewalk robot 102. The laser light(s) may strike objects and record the reflected pulses to generate the three-dimensional layout of objects in an environment. An illustrative example of raw LIDAR data is provided with FIG. 5.

Traversing module 126 may also be configured to organize the LIDAR data in a three-dimensional layout that maps the three-dimensional space around sidewalk robot 102. The LIDAR data associated with a three-dimensional environment may be received and projected to one or more two-dimensional layouts of the traversable area. The three-dimensional layout may be projected to a plurality of channels of two-dimensional views (e.g., an aerial or birds eye view, a horizon or eye level view, front or driver's view, etc.).

In some examples, LIDAR sensor 104 may have a long range of visibility and are reliable in the outdoor environment and the resultant point cloud data generated by LIDAR sensor 104 may be sparse in terms of representing the three-dimensional space. Traversing module 126 may be configured to receive the three-dimensional point cloud data and convert it into multiple two-dimensional maps (e.g., birds eye view, etc.) that contain statistical information calculated from the three-dimensional point cloud data. The algorithm may take the converted two-dimensional maps as input, instead of the three-dimensional point cloud data for STA prediction. A variety of methods can be used for converting point cloud data into, for example, 2D bird's-eye view maps without diverting from the scope of the disclosure. An illustrative example of mapped LIDAR data in a three-dimensional space is provided with FIG. 6.

Traversing module 126 may also be configured to operate vehicle system 108 according to the determined path. For example, traversing module 126 may identify a direction for sidewalk robot 102 (e.g., proceed northeast, rotate 35 degrees and proceed forward, etc.) and provide instructions for moving substantially in the identified direction to vehicle system 108. The instructions may initiate movement with the chassis, wheels, and other components of sidewalk robot 102 to operate sidewalk robot 102 in the direction identified.

Machine learning (ML) model engine 128 may be configured to provide the two-dimensional spatial images as input to a trained algorithm (e.g., machine learning model, deep learning algorithm, etc.). The output from the trained algorithm may identify a mask to apply to real-time LIDAR data. For example, the mask may define the environment associated with the sidewalk robot as safe or not safe, or in some examples, the STA may be associated with a "1" value and the area to avoid may be associated with a "0" value.

Figure 7:
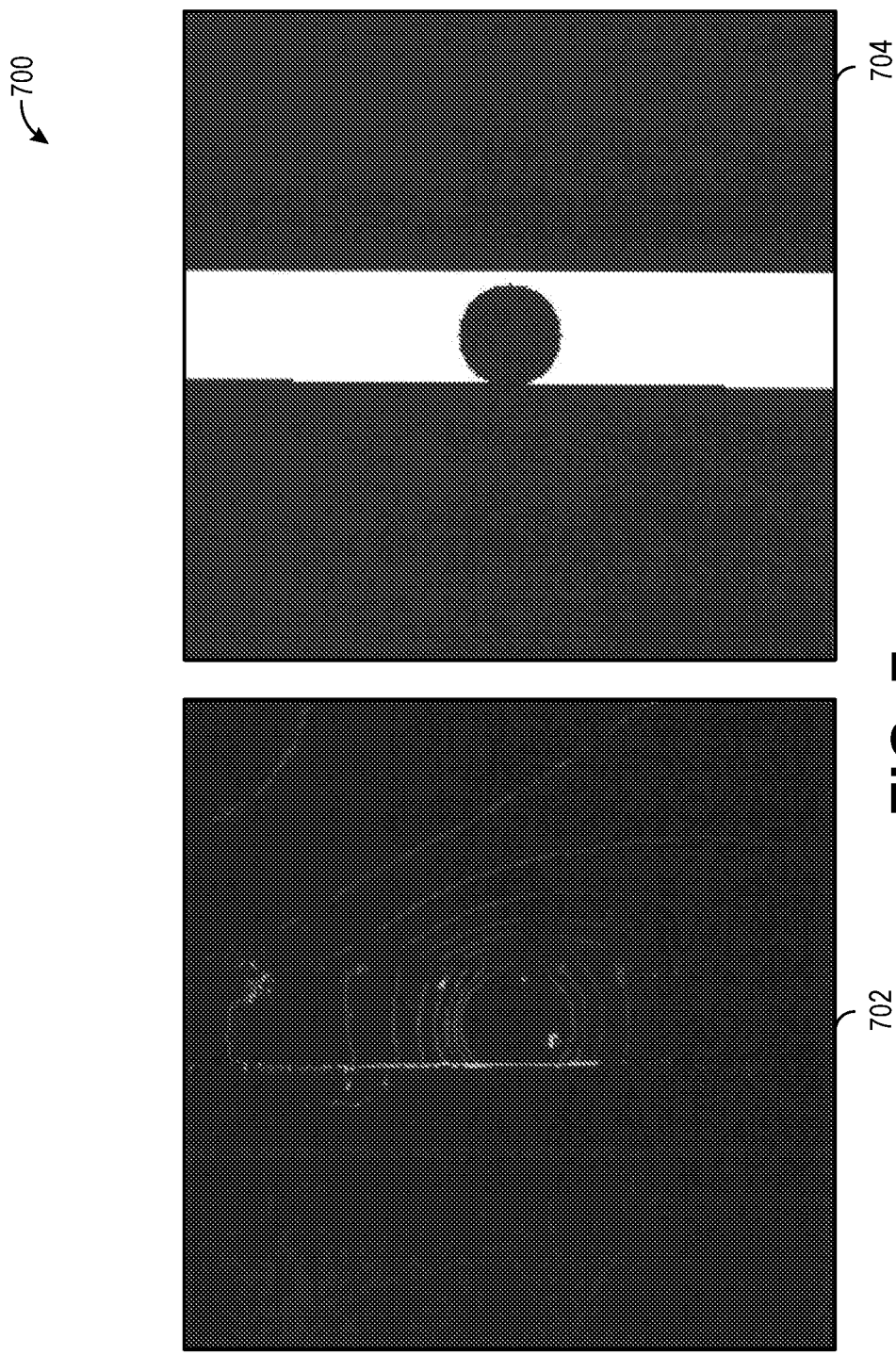
FIG. 7 is an illustrative example of a birds eye view gridded map and corresponding mask according to an embodiment of the disclosure.

In a sample illustration, ML model engine 128 may also be configured to grid the point cloud into voxels where each has a resolution of N centimeters in x and y directions, and a range of M meters in Z direction. A voxel may contain various number of points with <x, y, z, intensity> values inside. Each voxel may be converted to a grid in the two-dimensional map where the grid may be assigned values calculated as average intensity, maximal Z value, and average number of points. For example, one three-dimensional point cloud may be converted to three two-dimensional maps in this case. Subsequently, all maps may be stacked together and provided as input to the algorithm for STA prediction. A training pair of bird's-eye view gridded map and STA mask label (e.g., mask and LIDAR data, etc.) is illustrated in FIG. 7.

ML model engine 128 may also be configured to train the algorithm (e.g., machine learning model, deep learning algorithm, etc.). For example, the algorithm may be trained with sensor data from LIDAR sensor 104, image sensor 106 (e.g., red/green/blue camera, etc.), or other sensors that may accept data from an environment. The raw data may be collected in a training environment and provided as input to the algorithm, so that the output helps determine a safe traversable area.

Figure 2:
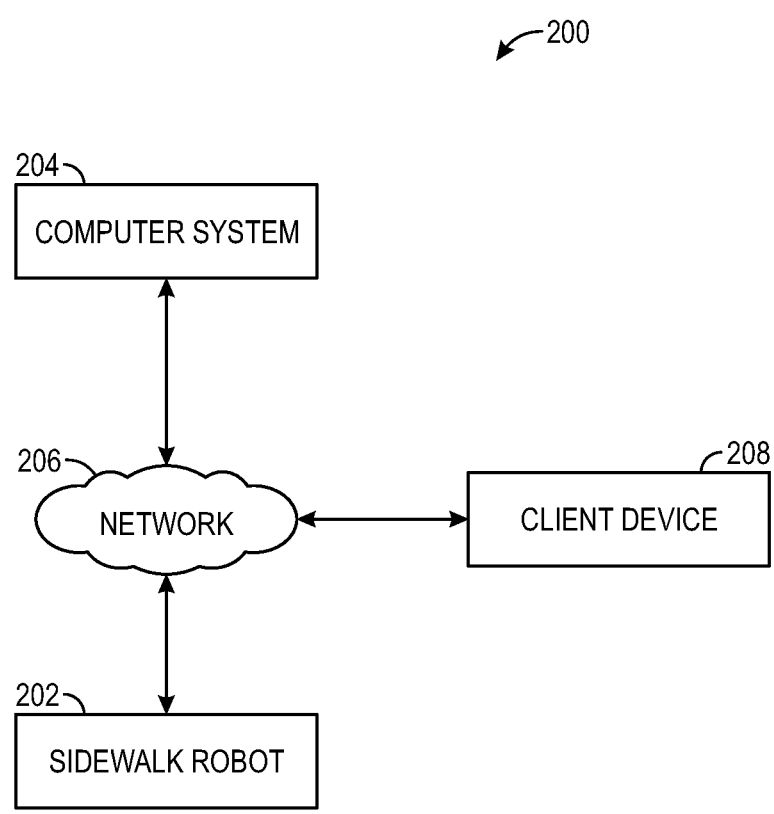
FIG. 2 is a block diagram illustrating a distributed network according to an embodiment of the disclosure.

In some examples, computer system 204 or client device 208 illustrated in FIG. 2 may be used to help train the algorithm. For example, a human labeler operating client device 208 may identify the safe traversable area by drawing polygons around safe areas associated with the environment during the training process. The polygons may be incorporated with a mask that may be overlaid with environment data. Sidewalk robot 102 may maintain a path with the polygons determined by the human labeler during training.

In some examples, client device 208 may remotely maneuver sidewalk robot 102 during the training process. The algorithm may learn the safe traversable area (STA) by the interactions between client device 208 and the environment, based in part on client device 208 directing sidewalk robot 102 to travel or avoid certain obstacles. For example, client device 208 may identify safe areas by providing steering commands to sidewalk robot 102 remotely via a network 206 as illustrated with FIG. 2. In other examples, client device 208 may select a safe area associated with the three-dimensional layout and sidewalk robot 102 may travel to the selected area.

In some examples, a heat map may be used during training of the algorithm that may identify areas to travel or avoid areas that are safe in the environment, based on the raw data. The heat map may identify incremental locations around sidewalk robot on a range of safety. The direction of sidewalk robot 102 may proceed according to locations that are more safe on the range of the heat map as compared to the less safe on the range. Information from the human labeler, heat map, or other information may help train the algorithm.

ML model engine 128 may also be configured to implement the trained algorithm to accept real-time data from one or more sensors that are similar to the sensors and data is used during the training process. Sidewalk robot 102 may determine a safe traversable area (STA) using real time sensor data provided to the trained algorithm.

A plurality of trained algorithm may be generated. For example, a first trained algorithm may correspond with a particular area and a second trained algorithm may correspond with a second particular area. Trained algorithms may be reused and applied to a similar area identified during the training. For example, a sidewalk with trees in graded covers in City A may be similar to a sidewalk with trees in City B. In another example, the sidewalk may be lined with restaurants and pedestrians that are similar to the static and dynamic objects in other environments. The trained algorithm may help the sidewalk robot navigate these various environments.

Similar areas may be determined through various processes. For example, the comparison of similarities between the area defined by the training and the area associated with sidewalk robot 102 may be conducted through image comparison analysis (e.g., comparing images of City A with images of City B, etc.) and/or LIDAR data comparison (e.g., distances between objects identified by sidewalk robot, or five circular objects in two environments are substantially similar, etc.). In some examples, a human labeler may determine variants in the format of a mask or polygon. The mask may be overlaid in association with the LIDAR data, the three-dimensional layout, or one or more two-dimensional layouts to help train the sidewalk robot to predict STAs.

ML model engine 128 may also be configured to correlate the analysis associated with the LIDAR data and the analysis associated with the STA with one or more thresholds. As a sample illustration, the training associated with the LIDAR data and/or the three-dimensional layout analysis may determine a first STA. A second STA corresponding with a mask or polygons may also be determined by the human labeler. Both the first STA and second STA may identify a path for the sidewalk robot to travel (e.g., based on the LIDAR data, the three-dimensional layout, and one or more dynamic or static objects, etc.) during the training process. When the difference between the first and second STA determinations are within a threshold accuracy (e.g. 90%, etc.), the trained algorithm may be provided to the sidewalk robot to implement in response to receiving raw LIDAR data from an environment.

ML model engine 128 may also be configured to apply input data to the trained algorithm. For example, sidewalk robot 102 may use sensory data from, for example, LIDAR and other sensors, to make a prediction of the STA while the sidewalk robot is navigating, based on output from the trained algorithm. In some examples, sidewalk robot 102 may identify the path without using an existing prebuilt map (e.g., high definition (HD) map, GPS, etc.).

In some examples, the algorithm may include machine learning, linear or nonlinear classification, or other deep neural network, including a convolutional neural network (CNN) or deep CNN. In some examples, the algorithm may comprise a supervised learning algorithm including a decision tree that accepts the one or more input features associated with the LIDAR data to provide a mask associated with the safe traversable area (STA). In some examples, the training phase may include little preprocessing compared to other image classification algorithms.

The algorithm may comprise a neural network that measures the relationship between the dependent variable (e.g., mask identifying a safe traversable area) and independent variables (e.g., distance) by using multiple layers of processing elements that ascertain non-linear relationships and interactions between the independent variables and the dependent variable.

The algorithm may further comprise a Deep Learning Neural Network, consisting of more than one layer of processing elements between the input layer and the output later. The algorithm may further be a Convolutional Neural Network, in which successive layers of processing elements contain particular hierarchical patterns of connections with the previous layer.

The algorithm may further comprise an unsupervised learning method, such as k-nearest neighbors, to classify inputs based on observed similarities among the multivariate distribution densities of independent variables in a manner that may correlate with fraudulent activity.

The algorithm may further comprise an ensemble modeling method, which combines scores from a plurality of the above algorithms or other methods to comprise a combined mask from multiple inputs.

In some examples, the algorithm may include linear regression. The linear regression may model the relationship between the dependent variable (e.g., mask identifying a safe traversable area) and one or more independent variables (e.g., distance). In some examples, the dependent variable may be transformed using a logarithm, fixed maximum value, or other transformation or adjustment.

FIG. 2 is a block diagram illustrating a distributed network according to an embodiment of the disclosure. For example, distributed system 200 may comprise hardware and software components to implement navigation of a safe traversable area (STA) for sidewalk robot 102. The illustration of distributed system 200 may comprise sidewalk robot 202, computer system 204, and client device 208 each of which may transmit electronic communications via network 206. In some examples, sidewalk robot 202 of FIG. 2 may be in addition to or an alternative of the illustration of sidewalk robot 102 of FIG. 1.

In some examples, computer system 204 may generate one or more algorithms (e.g., machine learning model, deep learning algorithm, etc.) by training the algorithms at computer system 204 and transmitting the trained algorithms to sidewalk robot 202 via network 206. Sidewalk robot 202 may implement the trained algorithms by receiving raw data from one or more sensors at sidewalk robot 202 and providing the raw data as input to the algorithms. In some examples, the raw data may be translated from a three-dimensional layout to one or more two-dimensional layouts and provided as input to the algorithms. In some examples, client device 208 may be operated by a human labeler to identify one or more masks associated with a three-dimensional layout determined from LIDAR data. The traversal of an area identified by a client device 208 may be utilized to identify the masks which may be overlaid on LIDAR data to determine the safe traversable area.

Figure 3:
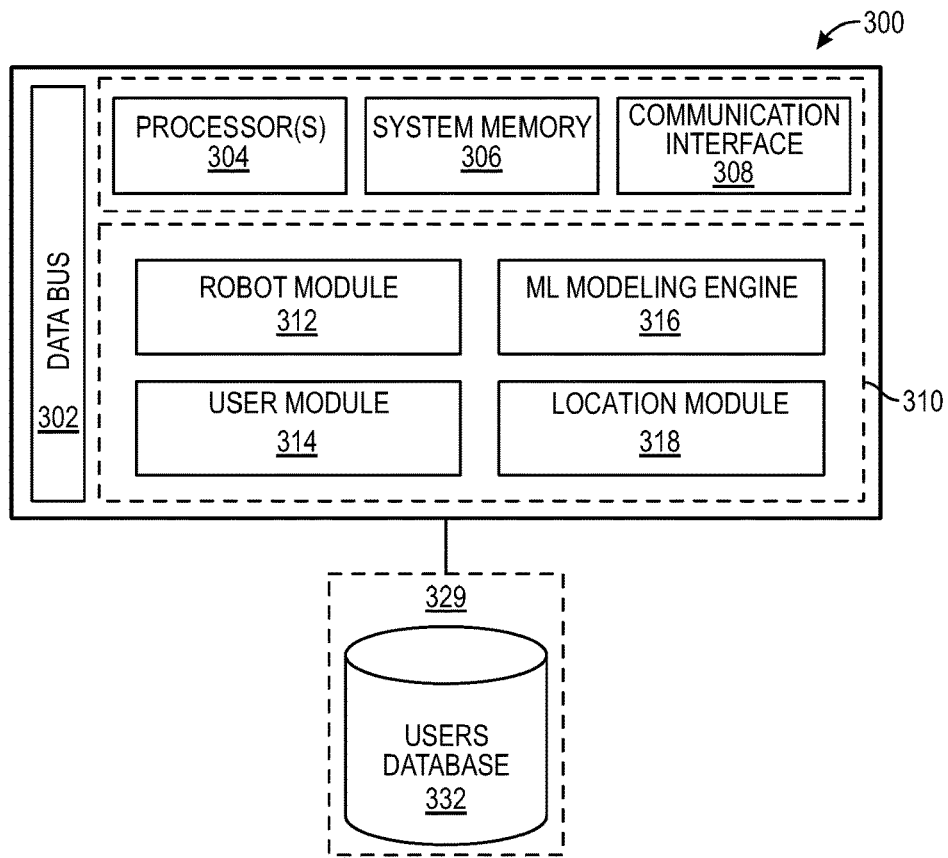
FIG. 3 is a block diagram illustrating an example of a computer system according to an embodiment of the disclosure.

An illustrative example of computer system 204 is provided with FIG. 3. FIG. 3 is a block diagram illustrating an example of a computer system 300 according to an embodiment of the disclosure. In some examples, computer system 300 of FIG. 3 may be in addition to or an alternative of the illustration of computer system 204 of FIG. 2. In some examples, computer system 300 of FIG. 3 may be incorporated (internally or externally) with sidewalk robot 102 of FIG. 1.

Computer system 300 may correspond with any number of computing devices or servers on a distributed network, including one or more processors 304 that communicate with a number of peripheral subsystems via data bus 302. These peripheral subsystems may include a system memory 306, communication interface 308, computer readable storage medium 310, and/or one or more databases 329.

Data bus 302 provides a mechanism for allowing the various components and subsystems of computer system 300 to communicate with each other. Although data bus 302 is shown schematically as a single bus, alternative embodiments of data bus 302 may utilize multiple buses. Data bus 302 may be several types of bus structures, including a memory bus or memory controller bus, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

One or more processors 304 may control the operation of computer system 300 and may comprise one or more application specific integrated circuits (ASICs) or field programmable gate arrays (FPGAs). Processors 304 may include single core and/or multicore processors. The processing resources of computer system 300 may be organized into one or more processing units. A processing unit may include one or more processors, one or more cores from the same or different processors, a combination of cores and processors, or other combinations of cores and processors. In some embodiments, one or more processors 304 may include one or more special purpose co-processors such as graphics processors, digital signal processors (DSPs), or the like. In some embodiments, some or all of the processing units of one or more processors 304 may be implemented using customized circuits.

In some embodiments, one or more processors 304 may execute instructions stored in system memory 306 or on computer readable storage media 310. In various embodiments, one or more processors 304 may execute a variety of programs or code instructions and may maintain multiple concurrently executing programs or processes. At any given time, some or all of the program code to be executed may be resident in system memory 306 and/or on computer readable storage media 310 including potentially on one or more storage devices. Through suitable programming, one or more processors 304 may provide various functionalities described above. In instances where computer system 300 is executing one or more virtual machines, one or more processors 304 may be allocated to each virtual machine.

System memory 306 may store program instructions that are loadable and executable on one or more processors 304, as well as data generated during execution of programs. Depending on the configuration and type of computer system 300, system memory 306 may be volatile (e.g., random access memory (RAM), etc.) and/or non-volatile (e.g., read-only memory (ROM), flash memory, etc.). Computer system 300 may also include additional removable storage and/or non-removable storage including, but not limited to, magnetic storage, optical disks, and/or tape storage. The disk drives and associated computer-readable media may provide non-volatile storage of computer-readable instructions, data structures, program modules, and other data for computer system 300. In some implementations, system memory 306 may include multiple different types of memory, such as static random access memory (SRAM), dynamic random access memory (DRAM), solid-state drive (SSD), or ROM.

Communication interface 308 provides an interface to other computer systems and networks and may serve as an interface for receiving data from and transmitting data to other systems or user devices. For example, communication interface 308 may enable computer system 300 to establish a communication channel to one or more user devices via the external communication network for receiving and sending information to and from sidewalk robot 202, client device 208, or other devices.

Communication interface 308 may support both wired and/or wireless communication protocols. For example, in certain embodiments, communication interface 308 may include radio frequency (RF) transceiver components for accessing wireless voice and/or data networks. This may include using cellular telephone technology, advanced data network technology, such as 3G, 4G, EDGE (enhanced data rates for global evolution), WiFi (IEEE 802.XX family standards, or other mobile communication technologies, or any combination thereof), global positioning system (GPS) receiver components, and/or other components. In some embodiments, communication interface 308 may provide wired network connectivity (e.g., Ethernet) in addition to or instead of a wireless interface.

Communication interface 308 may receive and transmit data in various forms. For example, communication interface 308 may receive input communications in the form of structured and/or unstructured data feeds, clickstream data, geographic locations from a positioning system (e.g., GPS), and the like. For example, communication interface 308 may be configured to receive or send data feeds in real-time from communication services such as web feeds and/or real-time updates from one or more third party information sources. Examples of applications that generate continuous data may include, for example, sensor data applications, location data applications, network monitoring and performance measuring tools, vehicular traffic monitoring, and the like.

Communication interface 308 may also be configured to communicate data from computer system 300 to other computer systems or networks. The data may be communicated in various different forms to one or more databases that may be in communication with one or more streaming data source computers coupled to computer system 300.

Computer system 300 may also comprise computer readable storage media 310. For example, computer storage media 310 may include system memory 306, volatile or nonvolatile memory, removable or non-removable media, implemented in any methodology or technology for storage of information such that computer readable instructions, data structures, program modules, or other data. The computer readable storage media may be non-transitory. Additional types of memory computer storage media may include PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by computer system 300. Combinations of any of the above should also be included within the scope of computer-readable media.

Computer storage media 310 may further comprise an operating system (O/S), robot module 312, user module 314, ML modeling engine 316, and/or location module 318. Computer system 300 may receive and store data in various databases 329, including users database 332. The modules and engines described herein may be software modules, hardware modules, or a combination thereof. If the modules are software modules, the modules will be embodied in a non-transitory computer readable medium and processed by processor(s) 304 with computer systems described herein.

Robot module 312 may be configured to replicate operation of sidewalk robot 202 remotely at computer system 204. For example, a safe traversable area (STA) may be determined for traveling by sidewalk robot 202, similar to the operations performed by traversing module 126 of FIG. 1. Electronic communications may be transmitted from robot module 312 to sidewalk robot 202 via network 206 to be implemented at sidewalk robot 202 by vehicle system 108 of FIG. 1.

User module 314 may be configured to identify features of a human labeler associated with training an algorithm for operation of sidewalk robot 202. For example, the human labeler may operate client device 208 to provide navigational direction to sidewalk robot 202 via network 206. User information associated with client device 208 may be identified, including a user identifier, client device identifier, location, and associated environmental characteristics associated with operation of sidewalk robot 202. A plurality of human labelers may be identified and user profiles associated with each human labeler may be stored by user module 314 and users database 332.

ML modeling engine 316 may be configured to train an algorithm (e.g., machine learning model, deep learning algorithm, etc.) using LIDAR data and/or projected two-dimensional layouts of environmental data, similar to operations performed by ML model engine 128 of FIG. 1. Electronic communications may be transmitted from ML model engine 316 to sidewalk robot 202 via network 206 to be implemented at sidewalk robot 202 by vehicle system 108 of FIG. 1.

Location module 318 may be configured to receive one or more electronic communications of a location of sidewalk robot 202 in accordance with a positioning system or absolute positions of sidewalk robot 202. In some examples, the locations may be incorporated with training of the algorithm. For example, sidewalk robot 202 may receive LIDAR data and transmit the LIDAR data to computer system 204. Upon receiving LIDAR data, a trajectory may be projected onto a representation of the range of data from sensors at computer system 204 were client device 208. The projection may include the LIDAR data in order to train the algorithm to identify the safe traversable area, where, in some examples, client device 208 provides the trajectory.

Figure 4:
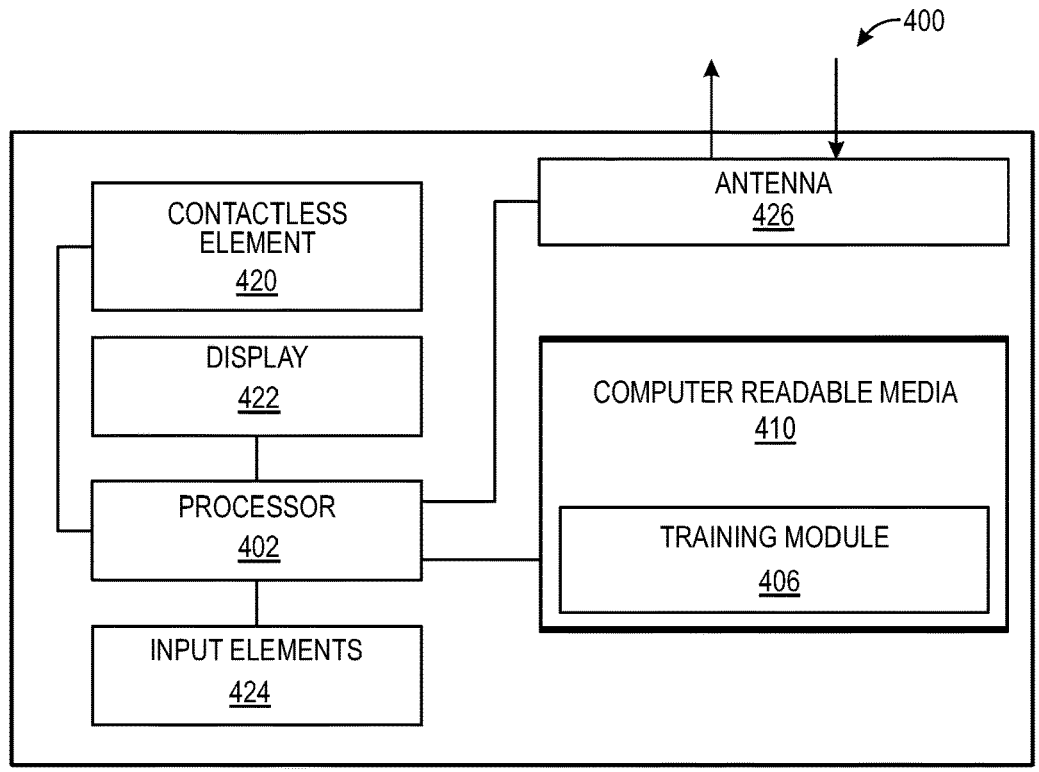
FIG. 4 is a block diagram illustrating an example of a client device according to an embodiment of the disclosure.

An illustrative example of client device 208 is provided with FIG. 4. FIG. 4 is a block diagram illustrating an example of a client device according to an embodiment of the disclosure. In some examples, client device 400 of FIG. 4 may be in addition to or an alternative of the illustration of client device 208 of FIG. 2. In some examples, client device 400 of FIG. 4 may be incorporated (internally or externally) with sidewalk robot 102 of FIG. 1.

Client device 400 may comprise hardware and software components to facilitate training one or more portions of an algorithm (e.g., machine learning model, deep learning algorithm, etc.). Client device 400 may take any specialized form and/or including a mobile phone, PDA, tablet computer, laptop computer, handheld specialized device, etc. Client device 400 may comprise a processor 402, computer readable medium 404 including one or more engines or modules used to execute computer instructions, display 422, input elements 424, antenna 426, and contactless element 420.

Processor 402 may perform processing functions for client device 400 by communicating with each subsystem and to control execution of computer instructions from computer readable media 404. Computer readable media 404 may be non-transitory. Client device 400 may also include display 422 to allow a human labeler user to see information and electronic communications via a user interface. Input elements 424 may allow the human labeler user to provide information to client device 400, including polygons or directions for remote operation of sidewalk robot 102. Client device 400 may also include antenna 426 for wireless data transfer and transmissions. Contactless element 420 of client device 400 may be capable of transferring and receiving near field communications in accordance with standardized protocol or data transfer mechanisms (e.g., ISO 14443/NFC).

Computer readable media 410 may be in the form of a memory, where one or more modules or engines may be embodied in computer readable media 410, including training module 406. Training module 406 may be configured to receive raw LIDAR data and/or three-dimensional layout of the raw LIDAR data for presentation at display 422. In some examples, training module 406 may receive one or more polygons in response to providing the corresponding LIDAR data. The polygons may correspond with safe areas for sidewalk robot 202 to travel in association with the environment.

Training module 406 may also be configured to train the algorithm (e.g., machine learning model, deep learning algorithm, etc.) using data pairs which contain LIDAR data (with or without supplemental RGB images) as well as masks that label the correct safe traversable area (STA) for the model to learn from.

Training module 406 may also be configured to allow human pilots to drive sidewalk robot 202, in person or remotely (e.g., teleoperation), although general operation of sidewalk robot 202 may operate autonomously. The driving directions may identify the STA by the human pilot and may be provided as input to the algorithm to help train algorithm. The raw LIDAR data and/or sidewalk robot 102 movement trajectory may be recorded as labels to train the algorithm. When a human pilot remotely controls sidewalk robot 102 on the sidewalk, the human pilot can reason where the STA is and command the robot to navigate within the STA in the environment. The trajectory executed by sidewalk robot 102 under human piloting may correspond with determining the mask to train the algorithm. Through such training, STA masks may be determined and stored to correspond with multiple features of the environment. When the algorithm is trained to a confidence threshold, the algorithm may predict where sidewalk robot 202 may travel safely under similar conditions, substantially mimicking what the human pilot might do.

Figure 5:
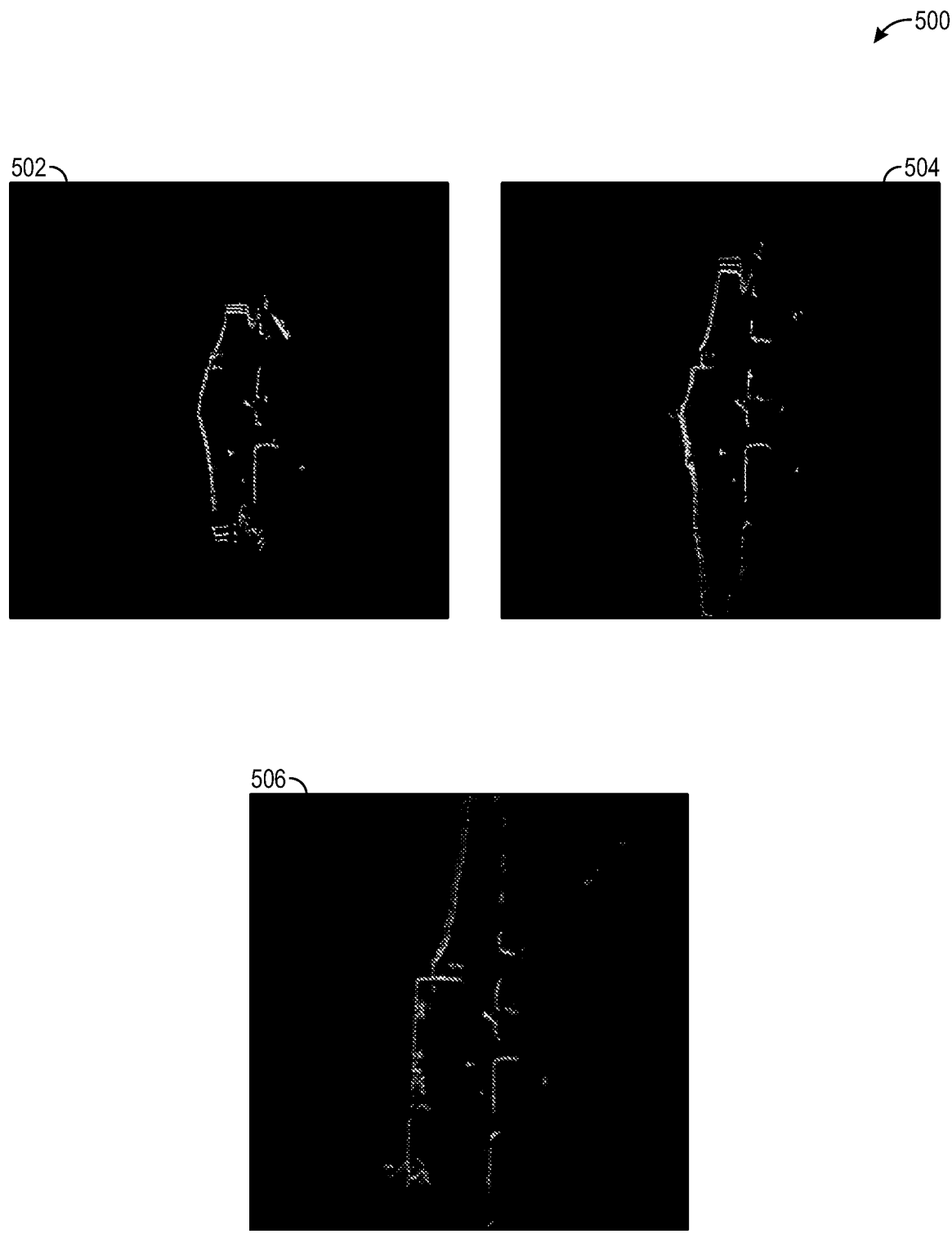
FIG. 5 are illustrative examples of raw data according to an embodiment of the disclosure.

FIG. 5 are illustrative examples of raw data according to an embodiment of the disclosure. In illustration 500, a plurality of raw LIDAR data image frames 502, 504, 506 are provided. The frames may comprise one snapshot in time of the LIDAR sensor data. In some examples, a frame may comprise the LIDAR data with RGB image data and/or data from other sensors. The raw LIDAR data may be received by directing one or more lasers in multiple directions around sidewalk robot 102. The laser lights may strike features of objects and record the reflected pulses to generate the three-dimensional layout of objects in the environment.

Figure 6:
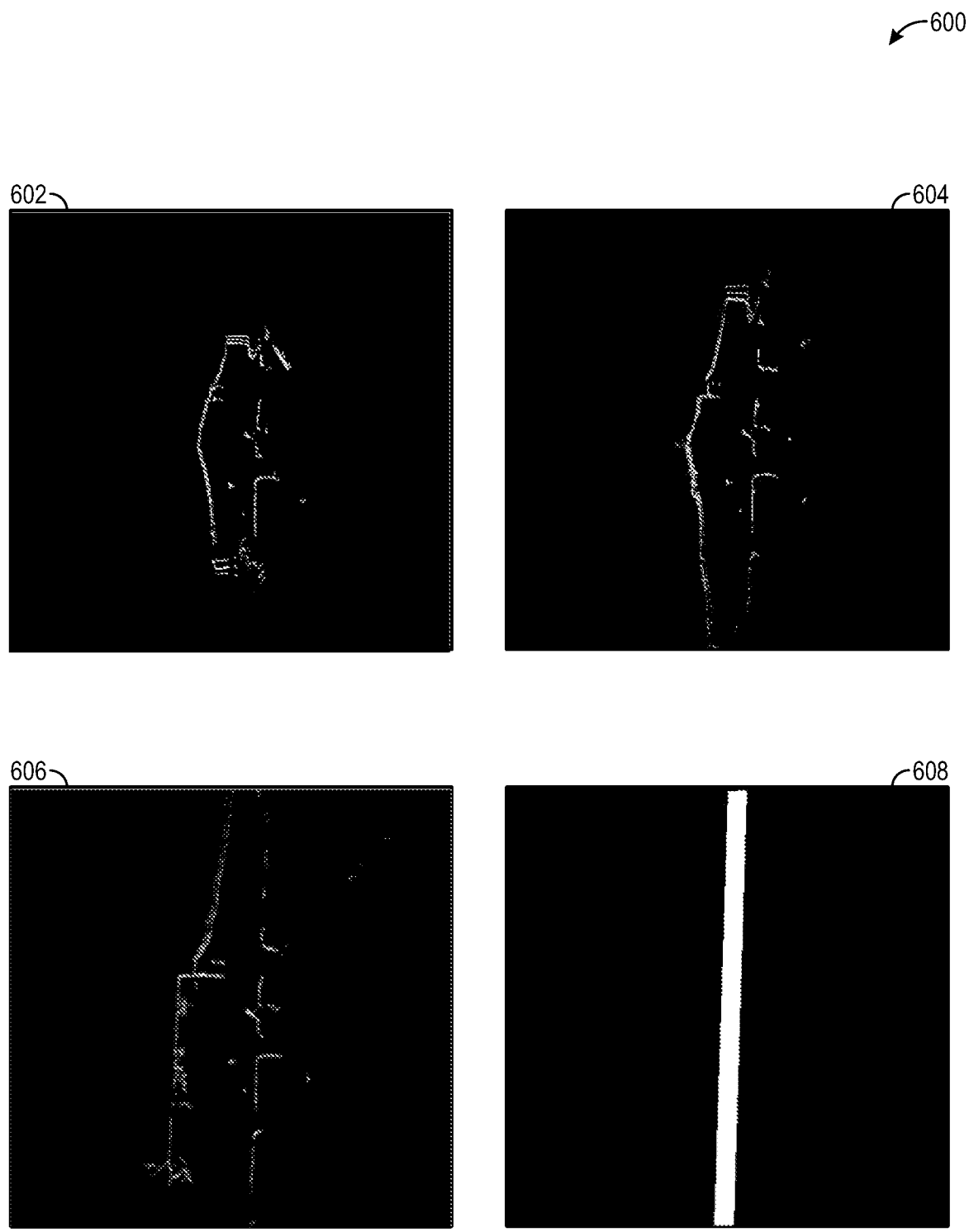
FIG. 6 are illustrative examples of birds eye view gridded map and corresponding mask according to an embodiment of the disclosure.

FIG. 6 are illustrative examples of birds eye view gridded map and corresponding mask according to an embodiment of the disclosure. In illustration 600, a plurality of channels of two-dimensional views 602, 604, 606 are provided. Corresponding mask 608 is generated based at least in part on providing the plurality of channels of two-dimensional views 602, 604, 606 to an algorithm (e.g., trained machine learning model, etc.). The output of the algorithm may correspond with corresponding mask 608. For example, corresponding mask 608 may define the environment associated with the sidewalk robot as safe or not safe, or in some examples, the STA may be associated with a "1" or white value and the area to avoid may be associated with a "0" or black value.

In some examples, plurality of channels of two-dimensional views 602, 604, 606 may be captured from different perspectives. For example, LIDAR sensor of sidewalk robot may capture a three-dimensional view of an environment around sidewalk. The three-dimensional view may be projected onto a plurality of channels of two-dimensional views. By changing the views and capturing additional perspectives, the additional channels of data may help capture data that would have been behind or under an object in another perspective.

In some examples, the data from the LIDAR sensor may be distinguishable from camera images. For example, the camera image may be associated with a grid of pixels, where each of the pixels are adjacent to other pixels and each contain information. Adjacent pixels may comprise a relationship as well as an approximate, consistent distance between each pixel. With the LIDAR sensor data, the three-dimensional images may comprise data within the three-dimensional space where adjacent points of data may not necessarily be adjacent to each other in the environment. There may be empty space in between based on, for example, static or dynamic objects that block other objects behind them.

When the three-dimensional images are projected into a two-dimensional plane or grid to mimic a camera image with a grid of pixels, the empty space between adjacent points of data may be filled in by the projection from three-dimensional space to two-dimensional space. The two-dimensional spatial images may be projected as an aerial or birds eye view, a horizon or eye level view, front or driver's view, or the like. The two-dimensional plane or grid may be provided as input to the algorithm for training or determination of the STA.

FIG. 7 is an illustrative example of a birds eye view gridded map and corresponding mask according to an embodiment of the disclosure. In illustration 700, a training pair of two-dimensional gridded map 702 and mask 704 is provided. In mask 704, the black areas may correspond with non-traversable areas of map 702 and the white areas may correspond with potentially safe traversable areas of map 702.

Figure 8:
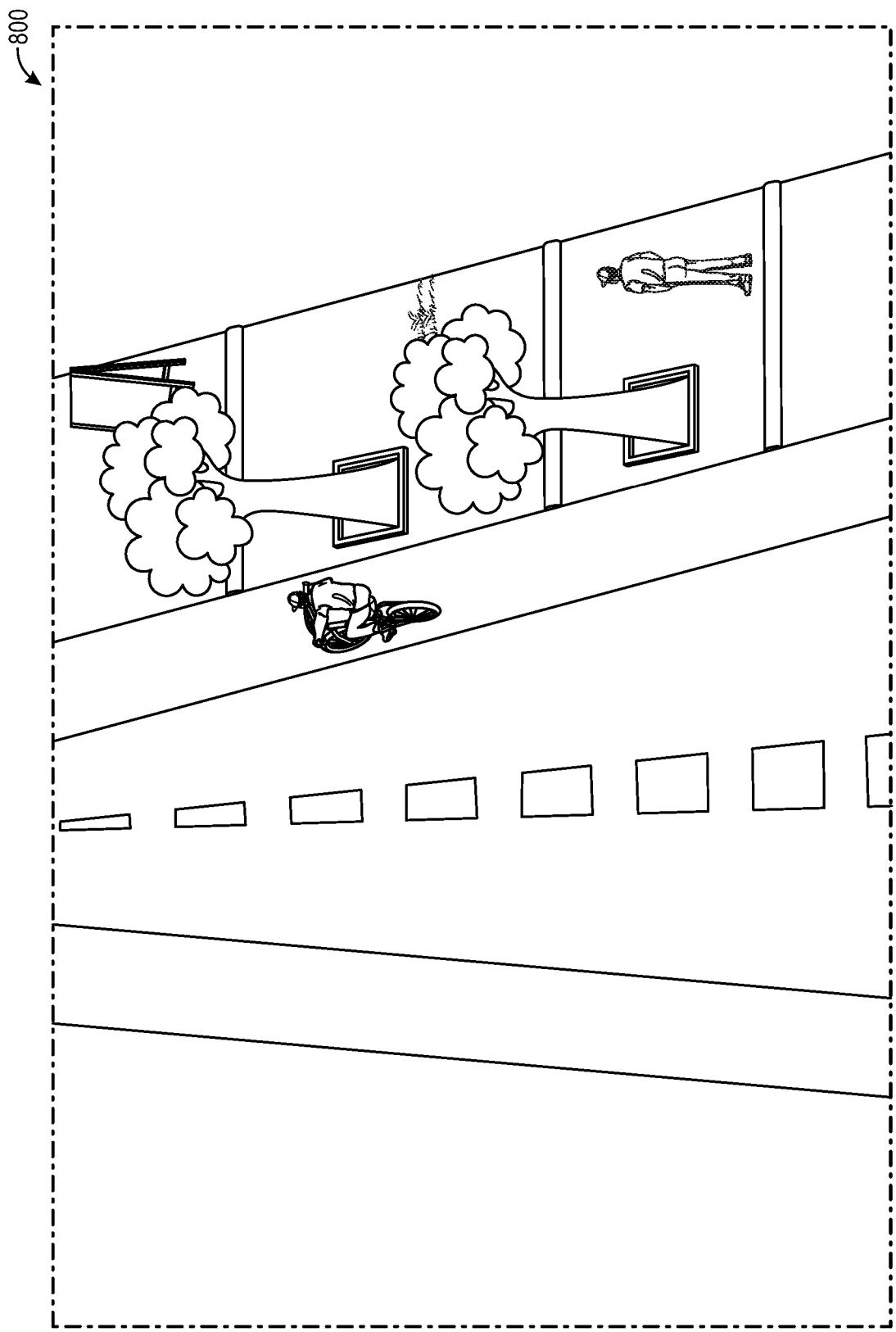
FIG. 8 is an illustrative example of an environment traveled by the sidewalk robot according to an embodiment of the disclosure.

FIG. 8 is an illustrative example of an environment traveled by the sidewalk robot according to an embodiment of the disclosure. In illustration 800, an environment is provided, including dynamic and static objects. For example, dynamic objects may include road users (e.g., pedestrians, bicyclist, animals, cars, etc.), temporary inanimate objects (e.g., sandwich board, etc.), and the like. Static objects may include walls, poles, parking meters, trees, grating around the base of the tree, grass, weeds, and the like. The environment may include lane markers along a road and no lane markers along the sidewalk or bike lane. Each of these dynamic or static objects may be identified by LIDAR data. The paths in this environment may account for traveling in unlabeled or labeled areas, including a crossing area defined by traffic markers, following instructions indicated by the detouring traffic signs, and/or traveling on a road where sidewalk robot 102 may interact with moving vehicles.

In some examples, a direction may be identified in the environment. For example, sidewalk robot 102 may identify an approximate direction to travel and, based on providing raw LIDAR data to the algorithm, may also identify a STA identified by the mask. Sidewalk robot 102 may travel in the approximate direction along a path that is identified as the STA in order to travel in the approximate direction (e.g., go forward, turn left, etc.). In some examples, a geographical map may be overlaid with the LIDAR data to determine an additional, approximate direction for sidewalk robot to travel.

In some examples, a dynamic object may be identified in association with an area that is temporarily not traversable. At a predetermined interval and/or movement by sidewalk robot 102, sidewalk robot 102 may receive additional raw LIDAR data that is again converted to three-dimensional layout, then two-dimensional layout, and then an updated mask of the STA. The second iteration of the mask may identify that the dynamic object has moved. Sidewalk robot 102 may travel along the area that was formerly occupied by the dynamic object based on the updated raw LIDAR data and determined mask.

In some examples, the dynamic object may be identified prior to movement of the dynamic object. For example, the dynamic object may be compared with previously identified dynamic objects associated with the determination of polygons during the training process. Upon determination of the dynamic object, additional data may be received to determine whether the space occupied by the dynamic object may be traveled by sidewalk robot 102. Otherwise, the dynamic object may be identified as a non-traversable area in the mask (e.g., "0," restricted, black, etc.).

Upon identification of the dynamic object in the environment, the STA may include the space occupied by the dynamic object within a threshold distance. For example, when the distance between dynamic object and sidewalk robot 102 exceeds the threshold distance (e.g., more than 20 feet, etc.), the STA may include the space occupied by the dynamic object. When the distance between dynamic object and sidewalk robot is less than threshold distance, the STA may restrict the space occupied by the dynamic object and sidewalk robot may travel in an area not occupied by the dynamic object. In some examples, the distance between the dynamic object and sidewalk robot 102 may trigger a request for additional information from LIDAR sensor 104 to receive updated raw LIDAR data to generate an updated mask.

Figure 9:
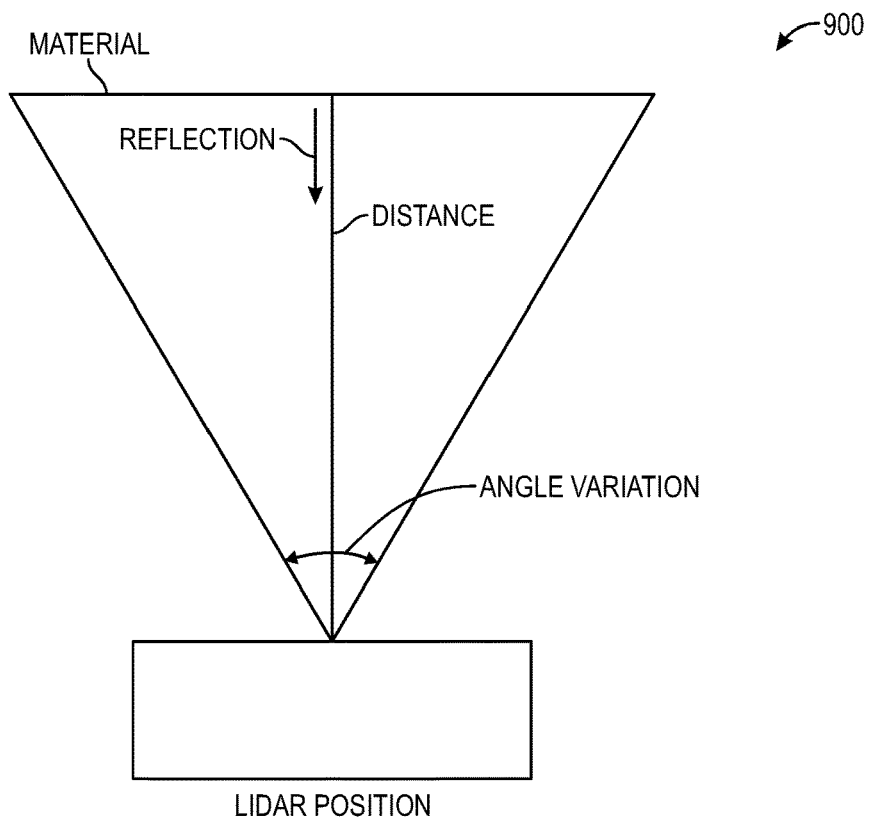
FIG. 9 is an illustrative example of a LIDAR sensor and sensor data according to an embodiment of the disclosure.

FIG. 9 is an illustrative example of a LIDAR sensor and sensor data according to an embodiment of the disclosure. In illustration 900, LIDAR sensor may direct a laser toward material at a particular angle. LIDAR sensor may measure the distance to the material by illuminating the material with laser light and measuring the reflected light with the sensor. LIDAR sensor may use ultraviolet, visible, or near infrared light to target a wide range of materials. The differences in laser return times and wavelengths can be stored and analyzed to help determine the material in the environment and correlate the determination of the material with the determination of whether the material is included or restricted from a safe traversable path, as well as whether the object is static or dynamic.

In some examples, the amount of diffused reflection may be measured to determine the texture of the material and predict, by a percentage likelihood, the material sensed by LIDAR sensor. For example, for purely diffuse surfaces, the textured quality of the surface may cause the reflected energy to dispersed uniformly in accordance with a substantially predictable percentage. LIDAR sensor may receive the reflected laser energy to determine the measurement and likely surface of material.

In some examples, material may comprise a specular surface (e.g., mirrors, glass, etc.) that may be difficult for LIDAR sensor to recognize, because radiated energy may not be dispersed and unlikely to be reflected directly back to the receiver of LIDAR sensor. In some examples, camera image sensor may be used in association with LIDAR sensor to detect and incorporate these specular surfaces with the STA mask determination. In some examples, additional sensor data from LIDAR sensor may be included with the determination of whether the specular surface object should be included as non-traversable with the mask.

Figure 10:
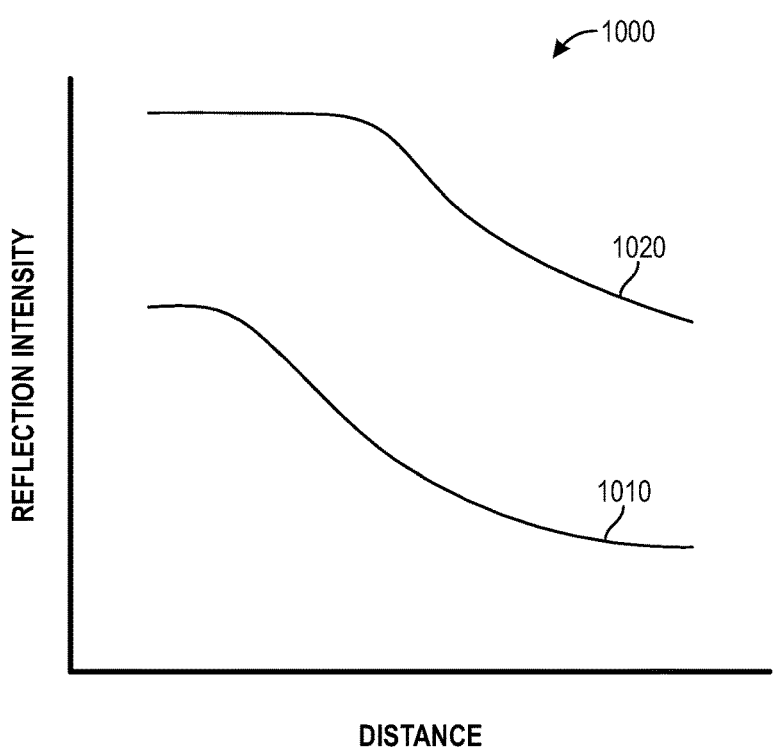
FIG. 10 is a chart illustrating reflection intensity over distance according to an embodiment of the disclosure.

FIG. 10 is a chart illustrating reflection intensity over distance according to an embodiment of the disclosure. In illustration 1000, the reflection intensity of the material may be used to determine the distance from sidewalk robot and the material. As illustrated, a first material 1010 may include a reflection intensity at a first value and a second material 1020 may include a reflection intensity at a second value. The initial reflection intensity of these objects may be identified and stored, in addition to the distance between sidewalk robot and the materials.

Figure 11:
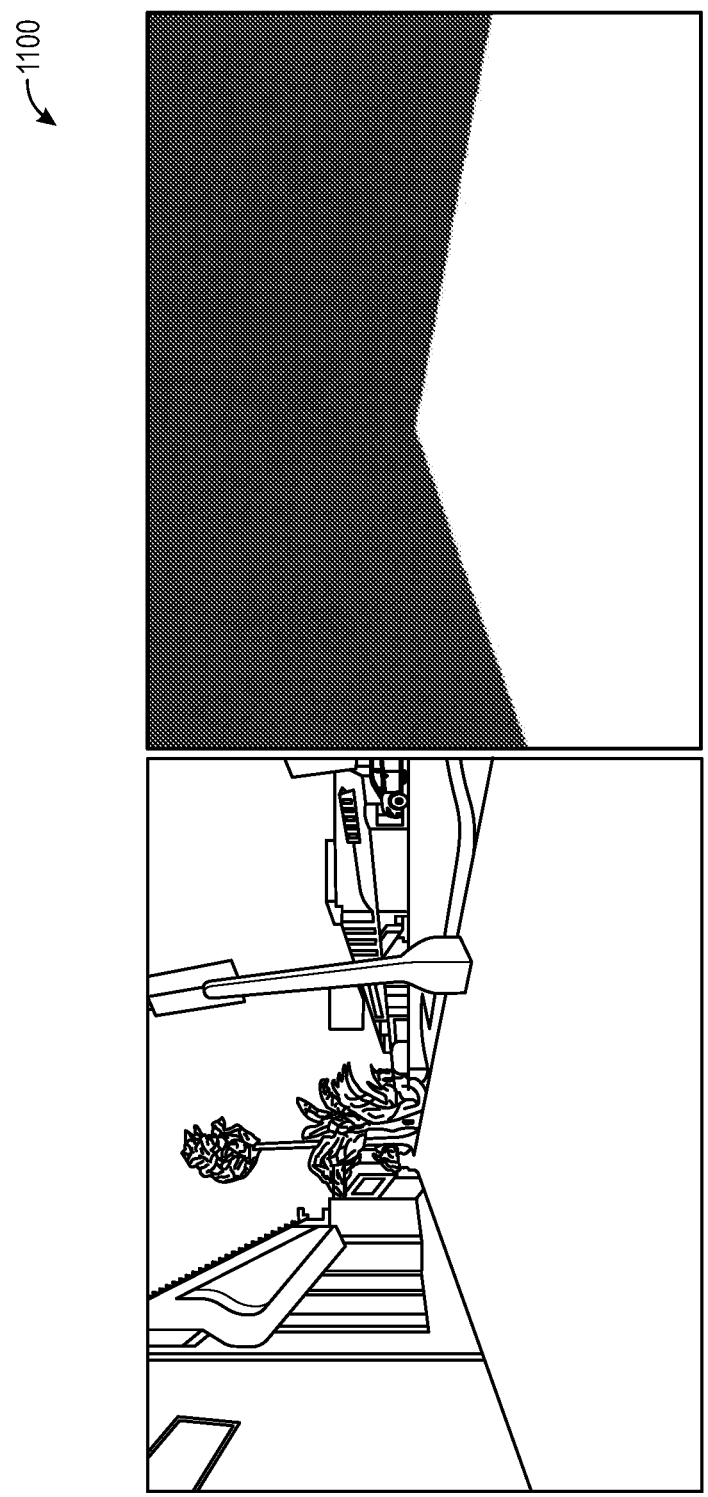
FIG. 11 is an illustration comparing an RGB image and mask according to an embodiment of the disclosure.

FIG. 11 is an illustration comparing an RGB image and mask according to an embodiment of the disclosure. In illustration 1100, front view RGB images may be combined with the two-dimensional layers that were projected from the three-dimensional point cloud data to generate an STA mask. In some examples, the updated mask with RGB images may be generated while robot navigates in real-time and/or after the mask is initially generated using the LIDAR data. The front view RGB images may be received from one or more RGB sensors (e.g., image camera, video camera, etc.).

In some examples, the RGB image and one point cloud may be generated in synchronization with data produced by a RGB camera and LIDAR sensor. Extrinsic calibration parameters may be predefined with sidewalk robot 102 or calculated in real-time to correlate the two data sources. The two data sources may be provided to a second trained algorithm (e.g., a fully convolutional network) that is separate from the trained algorithm that accepts only LIDAR data. The output of the second trained algorithm may include a corresponding STA mask. In some examples, the process may comprise two separate fully convolutional networks (or other algorithms), including, for example, a first algorithm for the RGB image and a second algorithm for a bird's-eye view gridded map.

In some examples, the algorithms may produce at least two masks corresponding with safe traversable areas and stack the masks together to generate a fused feature map. One way to achieve this may be to use a sparse projection matrix constructed based on extrinsic calibration parameters to project a feature map from the RGB camera to the feature maps from the bird's-eye view gridded map, and vice versa by using the transpose of the same sparse matrix. Any fully convolutional neural network or similar algorithm may be used for implementation of this process. For example, a base network architecture may correspond with UNET where the fusion among feature maps in the predefined architecture after Convolutional Layers. An illustrative example is provided in FIG. 13.

In some examples, the RGB images may be combined with LIDAR data to improve the determination of the STA mask by the algorithm that could result from RGB images as input alone. The mask may be more accurate with the LIDAR data included. For example, grass may be associated with a potential path of sidewalk robot. In determining the color of the grass using RGB images, the grass may usually correspond with the color green, but in different seasons of the year, times of the day, and the like, the grass may correspond with different colors (e.g., darker, lighter, brown, green, white in bright light, etc.). In these examples, the color of the grass identified in the RGB images may not be helpful in determining whether the grass corresponds with a STA for sidewalk robot.

By incorporating LIDAR data, the determination of the STA mask may not be reliant on light provided by the environment, at least because LIDAR sensor 104 can emit its own light via a laser. That laser may originally produce light and also bounce off objects in the environment to generate reflective light. When the reflection of the laser light returns from the material, LIDAR sensor 104 may measure the total distance and/or time to each object in the environment. LIDAR sensor 104 may calculate the objects in the environment to generate a geometric layout of the environment in a three-dimensional space, rather than merely color information of the environment. This three-dimensional layout information may be incorporated with two-dimensional images (e.g., aligned via the grid of pixels, etc.) and provided as input to a trained algorithm (e.g., machine learning, etc.), as discussed throughout the disclosure.

Figure 12:
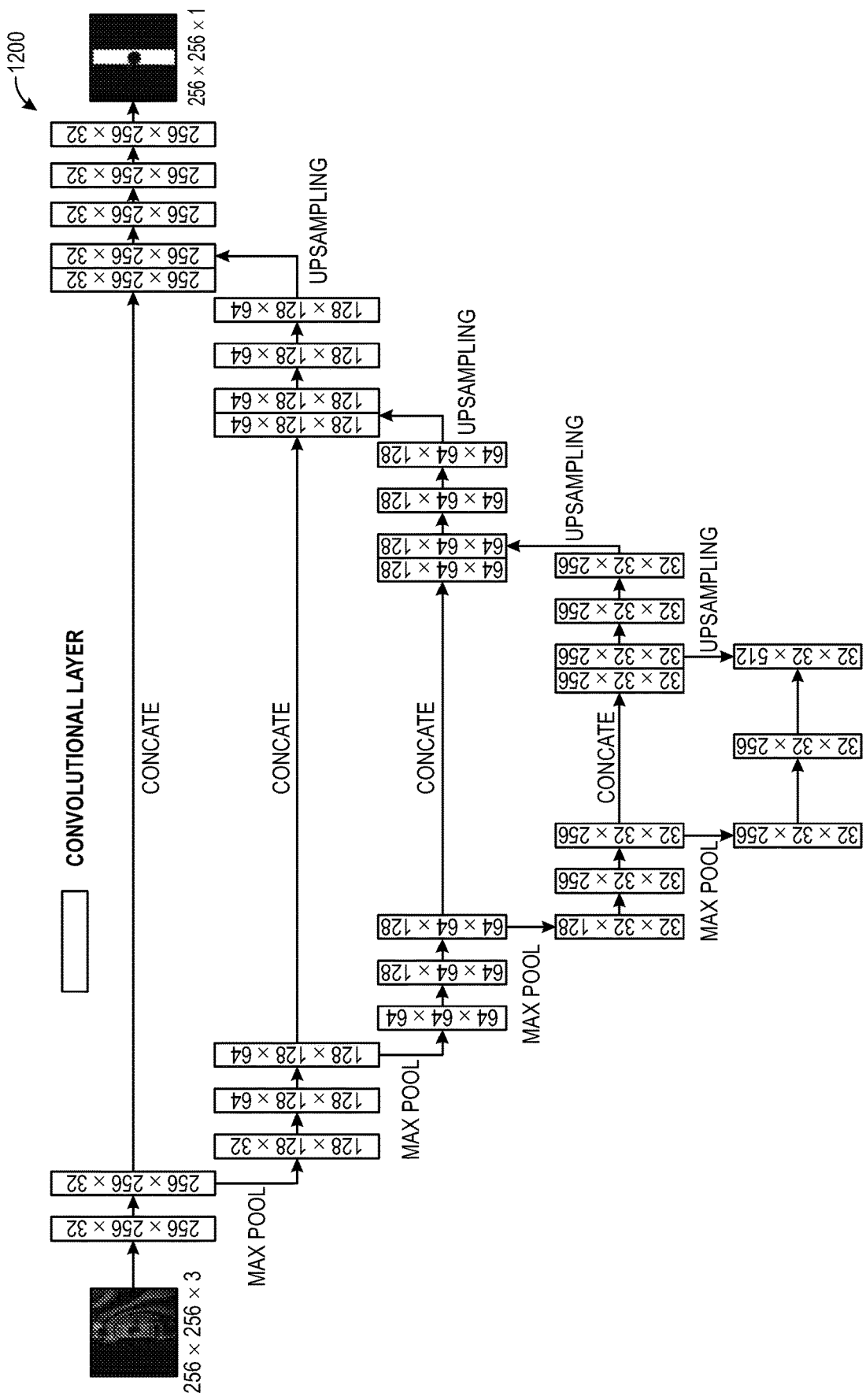
FIG. 12 is an illustration of a convolution neural network layer according to an embodiment of the disclosure.

FIG. 12 is an illustration of a convolution neural network layer according to an embodiment of the disclosure. In illustration 1200, a sample algorithm is provided. For example, a Deep Convolutional Neural Network for STA prediction may incorporate a Fully Convolutional Network (FCN) to predict the STA. The input to the algorithm (FCN) may include a two-dimensional map (e.g., the bird's eye-view gridded map) converted from the point cloud, and the output may include the STA mask.

As illustrated, the algorithm (illustrated as a convolutional neural network (CNN)) may consist of an input layer and an output layer, as well as multiple hidden layers. The initial two-dimensional image (e.g., the bird's eye-view gridded map) may be provided as input to the CNN. The algorithm may generate convolution layers (e.g., 256×256×32 and 256×256×32), which are sampled or pooled and used to generate two additional convolution layers (e.g., 128×128×64 and 128×128×64). The convolutional layers may convolve the input and pass its result to the next layer. During pooling, the dimensions of the data may be reduced by combining the outputs at one layer into a single neuron in the next layer. After sampling or pooling, the resolution may be smaller after each layer. The process may be repeated for sampling or pooling to generate additional convolution layers. The layers can be concatenated with layer up sampling or a decoupling solution.

The hidden layers of a CNN may consist of a series of convolutional layers that convolve with a multiplication or other dot product. The activation function may include a rectified linear unit (ReLU) layer, and is subsequently followed by additional convolutions such as pooling layers, fully connected layers and normalization layers. These may be hidden layers, because their inputs and outputs can be masked by the activation function and final convolution. In some examples, the final convolution can incorporate backpropagation in order to more accurately weight the end product (e.g., the STA mask). The layers may correspond with a sliding dot product or cross-correlation. This may have significance for the indices in the matrix, in that it affects how weight is determined at a specific index point.

During the training and learning process of the algorithm, each neuron in the CNN may compute an output value by applying a specific function to the input values coming from the receptive field in the previous layer. The function that is applied to the input values may be determined by a vector of weights and a bias (e.g., real number). The algorithm may implement iterative adjustments to these biases and weights throughout the training and learning process.

Figure 13:
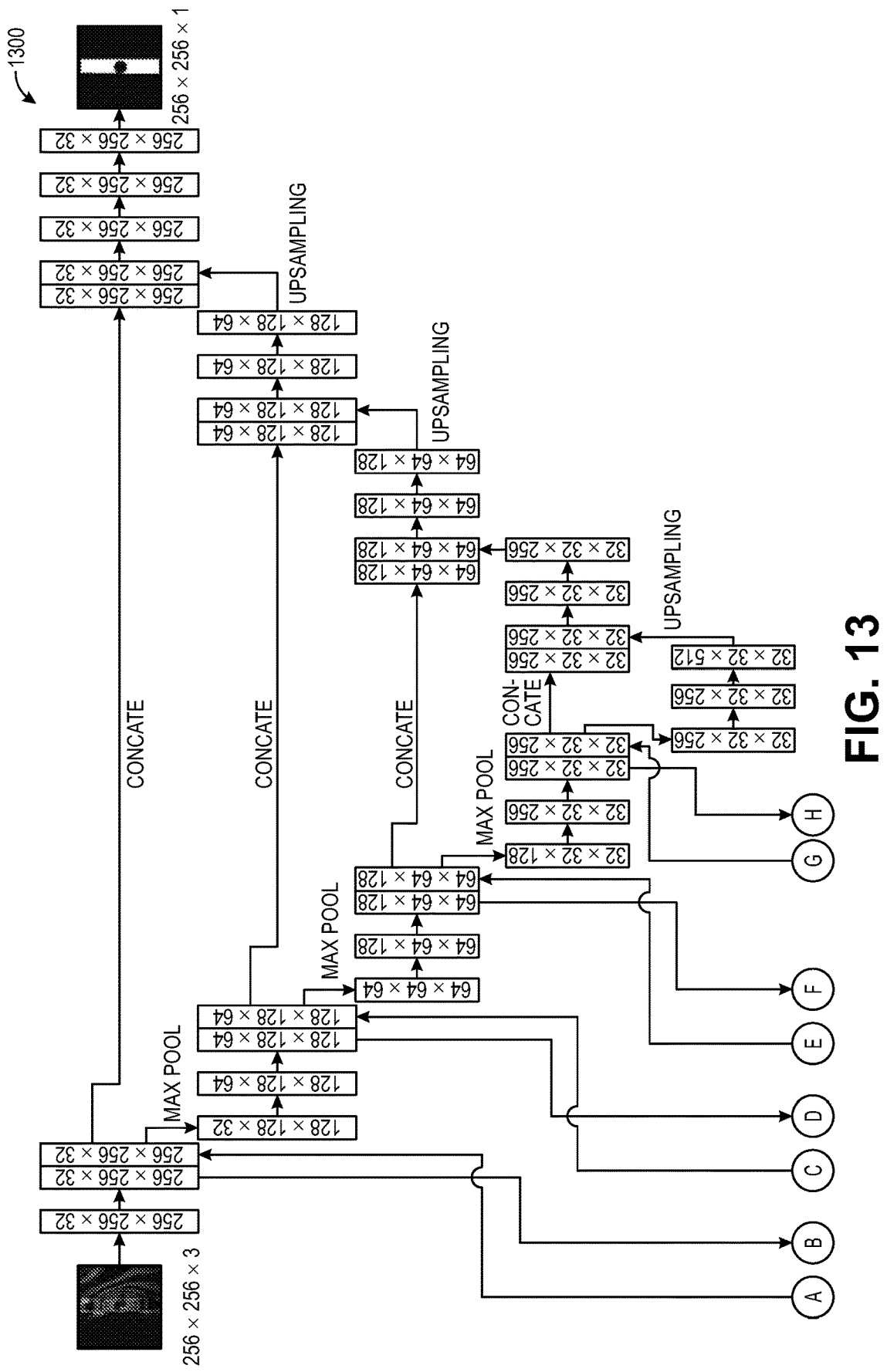
FIG. 13 is an illustration of a convolution neural network layer according to an embodiment of the disclosure.
Figure 13:
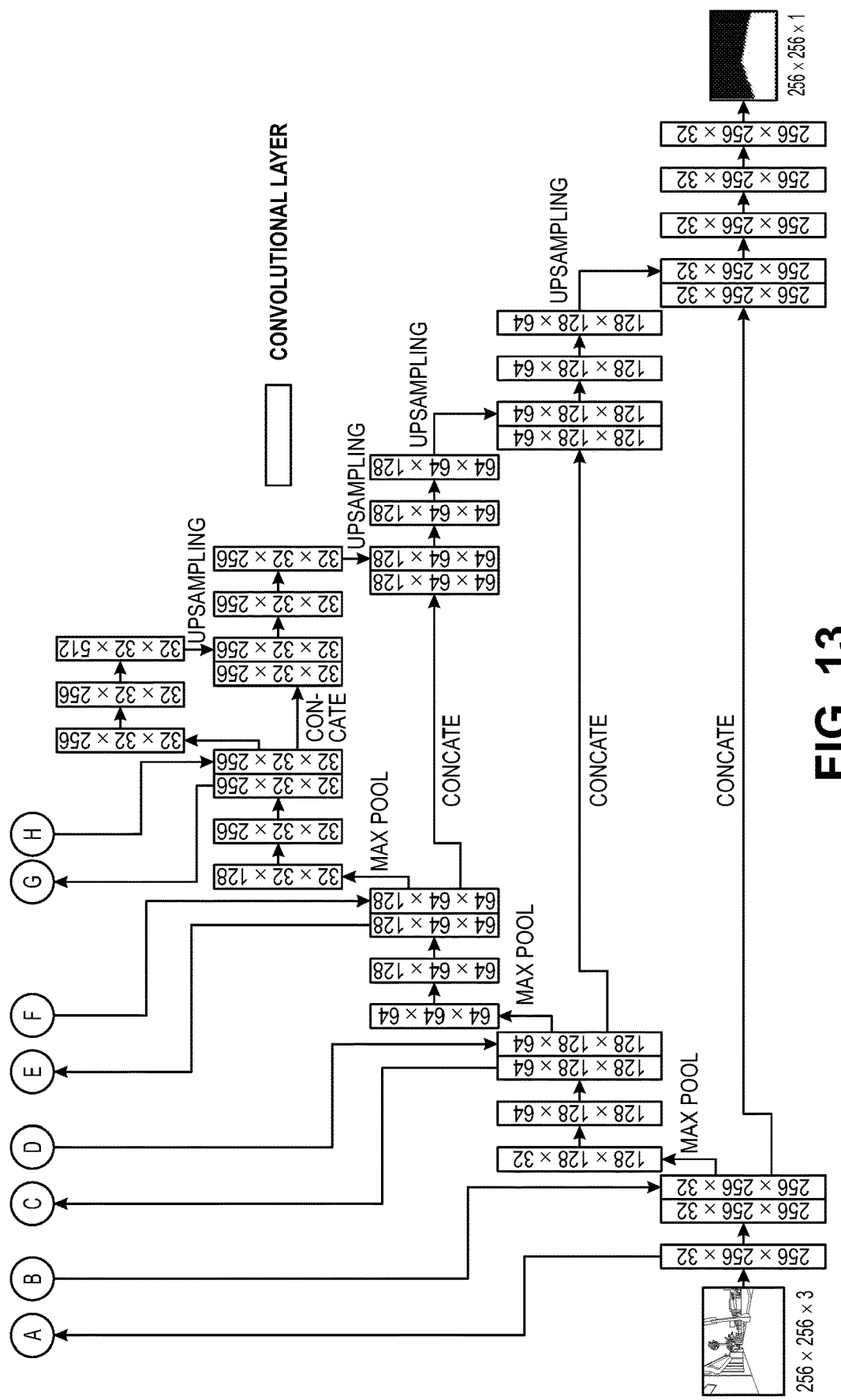

FIG. 13 is an illustration of a convolution neural network layer according to an embodiment of the disclosure. In illustration 1300, a sample algorithm is provided. For example, a Deep Convolutional Neural Network for STA prediction may incorporate a Fully Convolutional Network (FCN) to predict STA using both LIDAR and RGB data. The input to the algorithm (FCN) may include a two-dimensional map (e.g., the bird's eye-view gridded map of the raw LIDAR data) converted from point cloud data as well as an RGB image at a point in time, and the output may include the STA mask for each data source. The masks may be aggregated to identify a combined STA approximation of the environment. For each input, a similar process as described in FIG. 12 is implemented for pooling, sampling, upsampling the layers, and the like.

While the principles of the disclosure have been described above in connection with specific apparatuses and methods, it is to be clearly understood that this description is made only by way of example and not as limitation on the scope of the disclosure.

What is claimed is:

1. A sidewalk robot comprising:
 a LIDAR sensor;
 a vehicle system comprising mechanics and a power source to propel the sidewalk robot along a path of an environment;
 a processor; and
 a non-transitory computer readable medium including instructions that, when executed by the processor, cause the processor to perform operations including:
  projecting a laser light from the LIDAR sensor, wherein the projection is directed toward the environment occupied by the sidewalk robot;
  receiving one or more reflections of the laser light as LIDAR data for a safe traversable area of the environment that includes a sidewalk, wherein the safe traversable area is absent lane markers and corresponds with a metro geography, and wherein the LIDAR data corresponds with a three-dimensional layout of the environment;
  projecting the three-dimensional layout of the environment to one or more two-dimensional frames, wherein the one or more two-dimensional frames correspond with different perspectives associated with the sidewalk robot in the environment;

providing the one or more two-dimensional frames to a trained algorithm, wherein output of the trained algorithm generates a mask identifying the safe traversable area of the environment and a non-traversable area of the environment, the safe traversable area including an area occupied by a dynamic object detected by the sidewalk robot; and enabling operation of the sidewalk robot using the mask, wherein the operation of the sidewalk robot avoids the non-traversable area of the environment.

2. The sidewalk robot of claim 1, wherein the operations further include:

training an algorithm to generate the trained algorithm, wherein the training comprises:

determining a plurality of inputs associated with the safe traversable area; and applying the plurality of inputs to the algorithm to generate the trained algorithm.

3. The sidewalk robot of claim 1, wherein the trained algorithm is provided to the sidewalk robot when a difference between a first safe traversable area and a second safe traversable area are within a threshold accuracy for the environment.

4. The sidewalk robot of claim 1, wherein the area occupied by the dynamic object is identified as part of the safe traversable area when a distance between the dynamic object and the sidewalk robot exceeds a threshold distance.

5. The sidewalk robot of claim 1, wherein the mask identifying the safe traversable area of the environment is a first mask, and the operations further include:

receiving RGB data, wherein the RGB data is received as a two-dimensional frame;

providing the RGB data as input to a second trained algorithm, wherein a second output of the second trained algorithm produces a second mask; and combining the first mask and the second mask to generate a combined mask identifying the safe traversable area of the environment and the non-traversable area of the environment.

6. The sidewalk robot of claim 1, wherein the operation of the sidewalk robot using the mask avoids using a high-definition (HD) map or a global positioning system (GPS).

7. A non-transitory computer-readable storage medium storing instructions executable by one or more processors, wherein the instructions, when executed by the one or more processors, cause the one or more processors to perform operations including:

projecting a laser light from a LIDAR sensor of a sidewalk robot, wherein the projection is directed toward an environment occupied by the sidewalk robot;

receiving one or more reflections of the laser light as LIDAR data for a safe traversable area of the environment that includes a sidewalk, wherein the safe traversable area is absent lane markers and corresponds with a metro geography, and wherein the LIDAR data corresponds with a three-dimensional layout of the environment;

projecting the three-dimensional layout of the environment to one or more two-dimensional frames, wherein the one or more two-dimensional frames correspond with different perspectives associated with the sidewalk robot in the environment;

providing the one or more two-dimensional frames to a trained algorithm, wherein output of the trained algorithm generates a mask identifying the safe traversable area of the environment and a non-traversable area of the environment, the safe traversable area including an area occupied by a dynamic object detected by the sidewalk robot; and enabling operation of the sidewalk robot using the mask, wherein the operation of the sidewalk robot avoids the non-traversable area of the environment.

8. The non-transitory computer-readable storage medium of claim 7, wherein the operations further include:

training an algorithm to generate the trained algorithm, wherein the training comprises:

determining a plurality of inputs associated with the safe traversable area; and applying the plurality of inputs to the algorithm to generate the trained algorithm.

9. The non-transitory computer-readable storage medium of claim 7, wherein the trained algorithm is provided to the sidewalk robot when a difference between a first safe traversable area and a second safe traversable area are within a threshold accuracy for the environment.

10. The non-transitory computer-readable storage medium of claim 7, wherein the area occupied by the dynamic object is identified as part of the safe traversable area when a distance between the dynamic object and the sidewalk robot exceeds a threshold distance.

11. The non-transitory computer-readable storage medium of claim 7, wherein the mask identifying the safe traversable area of the environment is a first mask, and the operations further include:

receiving RGB data, wherein the RGB data is received as a two-dimensional frame;

providing the RGB data as input to a second trained algorithm, wherein a second output of the second trained algorithm produces a second mask; and combining the first mask and the second mask to generate a combined mask identifying the safe traversable area of the environment and the non-traversable area of the environment.

12. The non-transitory computer-readable storage medium of claim 7, wherein the operation of the sidewalk robot using the mask avoids using a high-definition (HD) map or a global positioning system (GPS).

13. A computer-implemented method comprising:

projecting a laser light from a LIDAR sensor of a sidewalk robot, wherein the projection is directed toward an environment occupied by the sidewalk robot;

receiving one or more reflections of the laser light as LIDAR data for a safe traversable area of the environment that includes a sidewalk, wherein the safe traversable area is absent lane markers and corresponds with a metro geography, and wherein the LIDAR data corresponds with a three-dimensional layout of the environment;

projecting the three-dimensional layout of the environment to one or more two-dimensional frames, wherein the one or more two-dimensional frames correspond with different perspectives associated with the sidewalk robot in the environment;

providing the one or more two-dimensional frames to a trained algorithm, wherein output of the trained algorithm generates a LIDAR mask generated from LIDAR data identifying the safe traversable area of the environment and a non-traversable area of the environment;

generating a combined mask by fusing the LIDAR mask with a RGB mask generated from RGB data; and enabling operation of the sidewalk robot using the combined mask, wherein the operation of the sidewalk robot avoids the non-traversable area of the environment.

14. The computer-implemented method of claim 13, further comprising:
    training an algorithm to generate the trained algorithm, wherein the training comprises:
        determining a plurality of inputs associated with the safe traversable area; and
        applying the plurality of inputs to the algorithm to generate the trained algorithm.

15. The computer-implemented method of claim 13, wherein the trained algorithm is provided to the sidewalk robot when a difference between a first safe traversable area and a second safe traversable area are within a threshold accuracy for the environment.

16. The computer-implemented method of claim 13, wherein the LIDAR mask identifies both dynamic objects and static objects.

17. The computer-implemented method of claim 13, further comprises:
    receiving the RGB data as a two-dimensional frame; and
    providing the RGB data as input to a second trained algorithm, wherein a second output of the second trained algorithm produces the RGB mask.

18. The computer-implemented method of claim 13, wherein the operation of the sidewalk robot using the fused mask avoids using a high-definition (HD) map or a global positioning system (GPS).

\* \* \* \* \*